United States Patent [19]

Kozakura

[11] Patent Number: 5,724,581

[45] Date of Patent: Mar. 3, 1998

[54] DATA BASE MANAGEMENT SYSTEM FOR RECOVERING FROM AN ABNORMAL CONDITION

[75] Inventor: Fumihiko Kozakura, Kawasaki, Japan

[73] Assignee: Fujitsu Limited, Kawasaki, Japan

[21] Appl. No.: 355,530

[22] Filed: Dec. 14, 1994

[30] Foreign Application Priority Data

Dec. 20, 1993 [JP] Japan ................................ 5-320461

[51] Int. Cl.$^6$ ................................................ G06F 17/30
[52] U.S. Cl. .................. 395/618; 395/608; 395/619; 395/620; 395/182.17; 395/444; 395/182.04
[58] Field of Search .................................. 395/600, 650, 395/575, 619, 618, 608, 620, 182.17, 444, 182.04; 364/200

[56] References Cited

U.S. PATENT DOCUMENTS

| | | | |
|---|---|---|---|
| 4,459,658 | 7/1984 | Gabbe et al. | 364/200 |
| 4,507,751 | 3/1985 | Gawlick et al. | 364/900 |
| 5,043,871 | 8/1991 | Nishigaki et al. | 364/200 |
| 5,265,245 | 11/1993 | Nordstrom et al. | 395/600 |
| 5,381,545 | 1/1995 | Baker et al. | 395/575 |
| 5,440,712 | 8/1995 | Takeda | 395/444 |
| 5,455,594 | 10/1995 | Haderle et al. | 395/600 |
| 5,455,944 | 10/1995 | Haderle et al. | 395/600 |
| 5,455,947 | 10/1995 | Suzuki et al. | 395/650 |
| 5,504,857 | 4/1996 | Baird et al. | 395/182.04 |

FOREIGN PATENT DOCUMENTS

| | | |
|---|---|---|
| 58-2937 | 1/1983 | Japan. |
| 62-121555 | 6/1987 | Japan. |
| 62-245348 | 10/1987 | Japan. |
| 4-209044 | 7/1992 | Japan. |

*Primary Examiner*—Wayne Amsbury
*Assistant Examiner*—Cheryl R. Lewis
*Attorney, Agent, or Firm*—Staas & Halsey

[57] ABSTRACT

In a data base management system, a checkpoint is recorded at appropriate intervals by recording a checkpoint during the process of a transaction and during the update of a logical page by providing a page table management table for managing a page table by a shadow page method. The page table also manages by the shadow page method a physical page corresponding to each logical page of a data base.

21 Claims, 17 Drawing Sheets

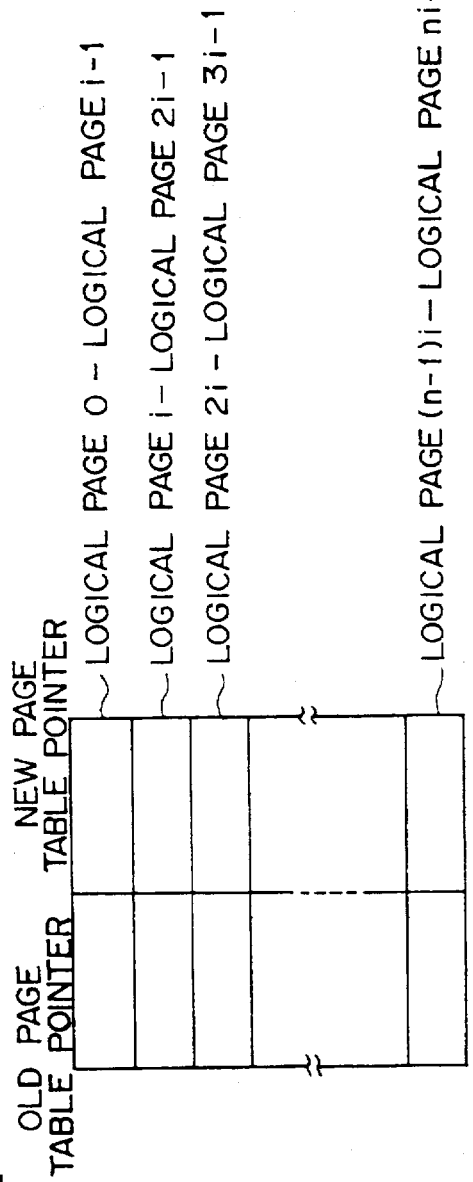
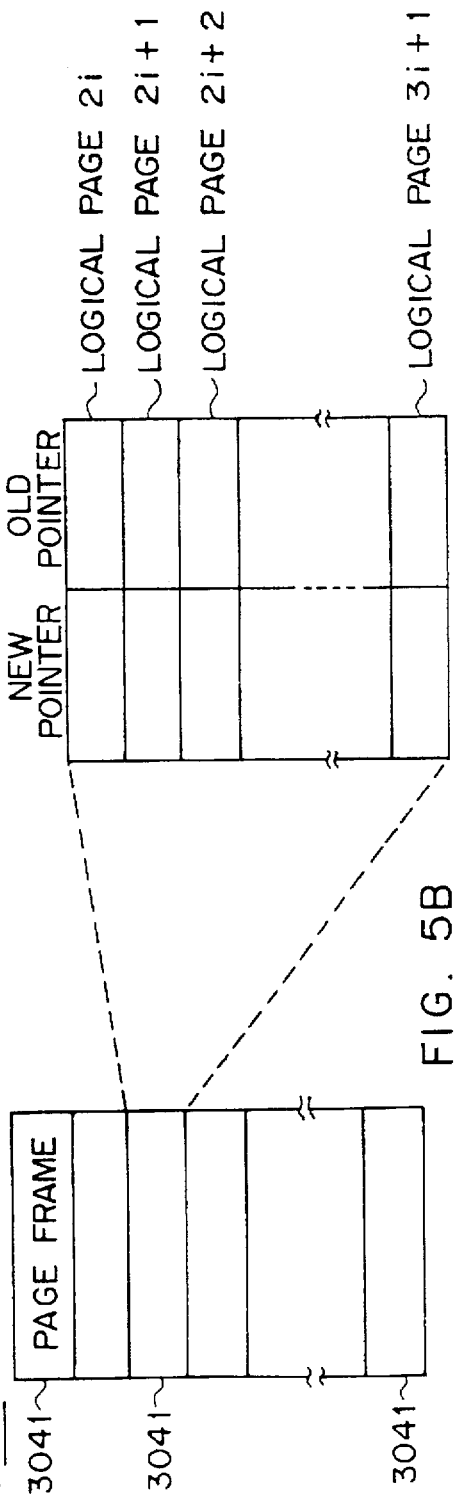
FIG. 5A
FIG. 5B

|   | OLD FLAG | NEW FLAG |
|---|---|---|
| 1 | FLAG | FLAG |
| 2 | FLAG | FLAG |
| 3 | FLAG | FLAG |
| 4 | FLAG | FLAG |
| . | | |
| . | | |
| . | | |
| . | | |
| . | | |
| m | FLAG | FLAG |

F I G. 6

| TYPE OF OPERATION | LOGICAL PAGE | OLD PHYSICAL PAGE | NEW PHYSICAL PAGE |
|---|---|---|---|
| | | | |
| | | | |
| | | | |
| | | | |

FIG. 7

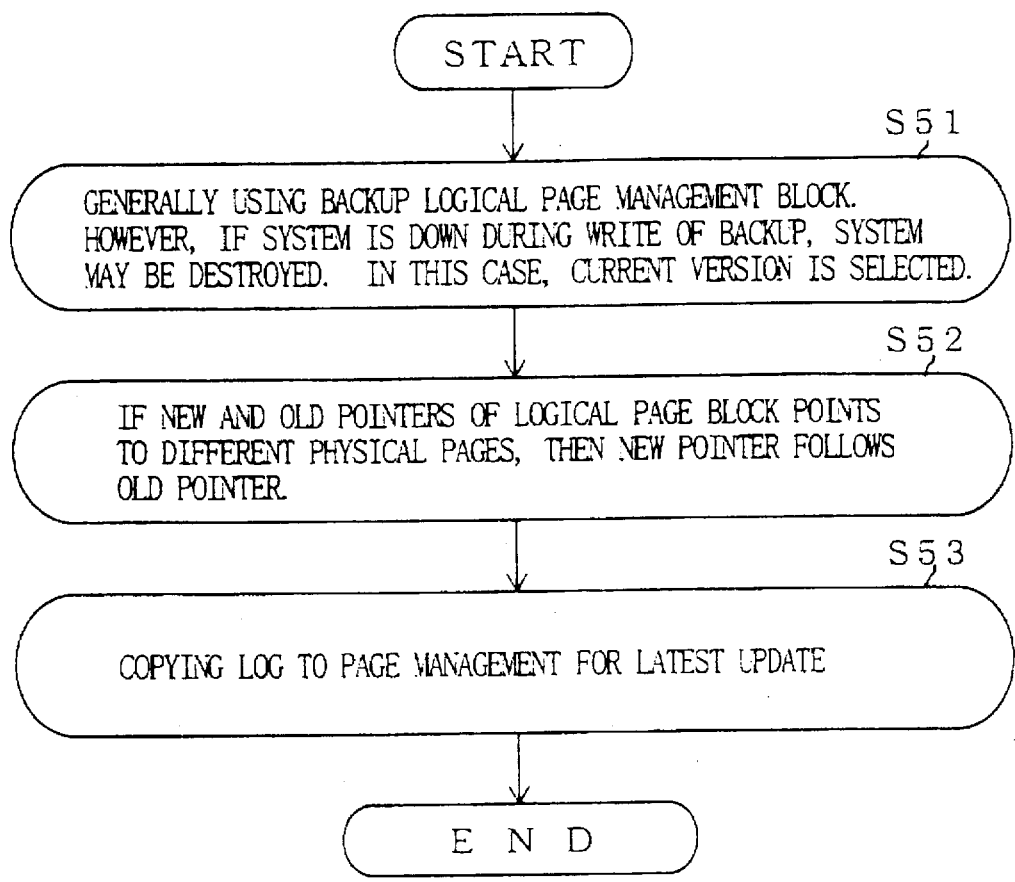
F I G. 1 5

DATA BASE MANAGEMENT SYSTEM FOR RECOVERING FROM AN ABNORMAL CONDITION

BACKGROUND OF THE INVENTION

1. Field of the Invention

The present invention relates to a data base management system for managing a data base, and more specifically to a data base management system for recording or using a checkpoint to recover from an abnormal condition of a data base.

2. Description of the Related Art

Recently, with the increasing importance of efficient data processing technologies, the significance of data bases has been more clearly recognized. In particular, open systems forming computer networks such as local area networks (LAN), wide area networks (WAN), etc. comprising units and devices of different manufacturers have been commonly installed. Data bases are also indispensable in these open systems.

In a data base system, reliability is extremely important. Accordingly, system failures due to, for example, disconnections of the power source or transaction failures, should not prevent the data base from maintaining a logical consistency.

Shadow page systems are well-known as reliability control systems in data base systems. According to the shadow page system, data in a data base are updated in a transaction process with the update result stored in a position different from where the data are stored before the update.

In a logical configuration, a data base has a plurality of fixed-length logical pages. Data on each of the logical pages are actually stored on physical pages generally referred to as blocks or slots of physical storage media. The physical pages are the same size as the logical pages. Therefore, a page table (page mapping table) is provided to indicate the correspondence (mapping information) between them.

In the shadow page system, the latest data storage page (a current page) and the page storing data before the latest update (a shadow page) are generated each time the data base is updated in each transaction as described above. Accordingly, the above described page table has a current version and a backup version, and their physical data are stored in a non-volatile secondary storage medium. Normally, each of these page tables is divided into a plurality of blocks to be stored in a secondary storage unit. These blocks are data transmission units between the main storage unit and the secondary storage unit.

FIGS. 1A through 1C show the above described conventional shadow page system.

In the example shown in FIG. 1, logical page n is updated in a transaction. Before the transaction, pointer $P_C$ at an entry position on logical page n in the page table of the current version and pointer $P_B$ at an entry position on logical page n in the page table of the backup version point to physical page i (FIG. 1A).

Next, when the transaction is started and the update of logical page n is also started, unused physical page j is obtained as a new physical page corresponding to logical page n from the secondary data storage unit (not shown in FIG. 1). The updated data are stored on physical page j. Thus, in the page table of the current version, current page pointer $P_C$ corresponding to logical page n is changed into a value indicating physical page j. Physical page i pointed to by backup page pointer $P_B$ is a shadow page (FIG. 1B).

If the transaction normally terminates and the latest data are stored on physical page j, then the value of current page pointer $P_C$ is copied to backup page pointer $P_B$ corresponding to logical page n of the backup page table. Both pointers $P_B$ and $P_C$ point to physical page j. Thus, the shadow page, that is physical page i, is deleted (FIG. 1C).

Thus, the shadow page system has two page tables, that is, a current version table and a backup version table. While logical page n is being updated in a transaction, the data before the latest update are stored on the shadow page (physical page i). The pointer to the shadow page is also stored in the backup page table. Thus, even if a transaction failure arises, the shadow page can be processed as the latest physical page and the transaction can be nullified by copying the data in the backup page table to the current page table, thereby successfully maintaining the logical consistency of a data base.

However, updating a page table in the secondary storage unit for each transaction results in a large overhead and lowers the system performance. Therefore, a current page table is stored in the main storage unit to copy the contents of the current page table to the backup page table stored in the secondary storage when a checkpoint is recorded. In this case, data base update history information of the data base are obtained in the history file (log file) generated in the secondary storage unit for recovery.

Conventionally, data are copied to the secondary storage unit as backup data of a data base. The backup data are used with a log (corresponding to the above described data base update history information, that is, a history of operations added to the data base by a transaction) for use in re-execution. However, copying data is accompanied by a low-speed writing of data to the secondary storage unit and takes considerable time. Additionally, the necessary size of the log is large, thereby requiring a long time for re-execution.

The above described checkpoint has been developed to shorten recovery time.

An update operation in a transaction is not performed directly in the secondary storage unit, but in the buffer of the main storage unit. Thus, the updated data in the buffer should be included in the data base stored in the secondary storage unit. The checkpoint is defined as a point where the data on the logical page stored in a buffer in the main storage unit match the data on the page stored in the secondary storage unit corresponding to the logical page.

Generally, the checkpoint is cyclically or at a given time by a DBMS (data base management system). When a checkpoint is recorded, the latest data in a data base are stored in the secondary storage unit which is a non-volatile storage medium. Therefore, a recovery process can be performed when a checkpoint is recorded, thereby shortening the recovery time.

In a data base system in which a checkpoint is used, the time taken for recovery from failure changes in proportion to the size of the log written in a history file from the latest checkpoint to an occurrence of a failure.

However, in the conventional checkpoint recording system, a checkpoint is recorded when no transactions are being processed (a transaction-oriented checkpoint). Since the logical consistency of a data base cannot be maintained generally while a transaction is being processed, the recovery process will be complicated if a checkpoint is recorded while the transaction is being processed. There is an operation-oriented checkpoint recording system in which a checkpoint can be recorded while a transaction is being processed, but not while a data base is being operated on. In this system, when the operation being performed has been completed, the execution of a new operation is stopped. If the operation being performed has been completed, a checkpoint is recorded with the transaction suspended in a wait state (an operation-oriented checkpoint).

In the above described conventional transaction-oriented checkpoint, a checkpoint can be recorded only when no transactions are being processed, thus limiting the checkpoint time to a specified scope. Thus, checkpoints are recorded at long intervals, thereby requiring a larger log and a longer time for recovery. In such a case, recording the checkpoint temporarily stops the operation of the data base and therefore lowers the system performance.

In the case of the conventional operation-oriented checkpoint, a data base cannot be processed and the current page must be completed when a checkpoint is recorded. The data in the current page table in the main storage unit are stored in the backup page table in the secondary storage unit, and the transaction being processed when a checkpoint is recorded is effectuated using a log obtained after the checkpoint. In this case, much time is required for the backup of the current page table if a large number of pages need to be processed, thereby failing to perform a high-speed checkpoint process.

SUMMARY OF THE INVENTION

The present invention relates to a data base management system for performing a data base checkpoint process and a failure recovery process. It aims at quickly recording a checkpoint during the execution of a transaction, and quickly performing a failure recovery process.

The present invention comprises a current page table for storing a page table in which a shadow page system manages a physical page corresponding to each logical page in a data base, and a current page table management table for managing the page table in the current page table using the shadow page system. When a checkpoint is recorded, the data in the current page table management table are stored as backup data in the secondary storage unit excluding a shadow page, and the data in the current page table are stored "as is" as backup data in the backup page table in the secondary storage unit. Then, the log of a transaction is stored in a log file in the secondary storage unit at the completion of the transaction. If a system failure occurs, the data base restores its state before the failure based on the page table management table and the page table stored as backup data in the secondary storage unit, and the log file.

The current page table management table for managing the page table using the shadow page system enables a checkpoint to be recorded while a transaction is processed, thereby recording checkpoints at the optimum intervals and quickly performing a failure recovery.

BRIEF DESCRIPTION OF THE DRAWINGS

One skilled in the art can easily understand additional features and objects of this invention from the description of the preferred embodiments and some of the attached drawings. In the drawings:

FIGS. 5A and 5B show practical configurational examples of the first current logical page management block and the first current logical page block;

FIG. 6 shows the configuration of the physical page blank management map;

FIG. 7 shows the data in the transaction log;

FIG. 15 is a flowchart showing the recovery process;

DESCRIPTION OF THE PREFERRED EMBODIMENTS

Figure 1A:
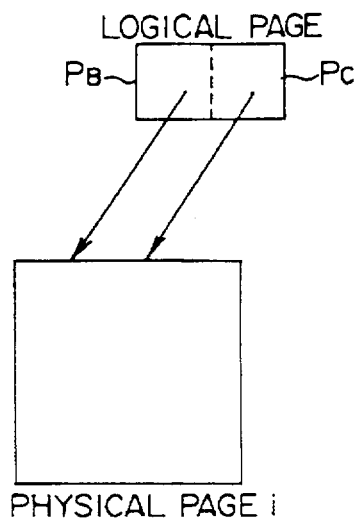
FIGS. 1A through 1C show the conventional shadow page system.
Figure 1B:
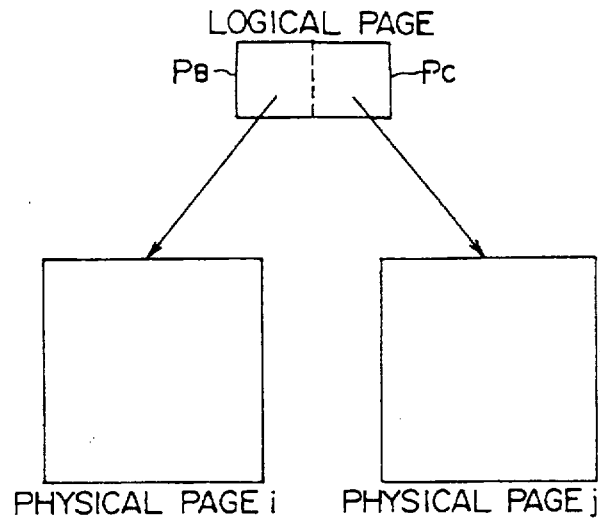
Figure 1C:
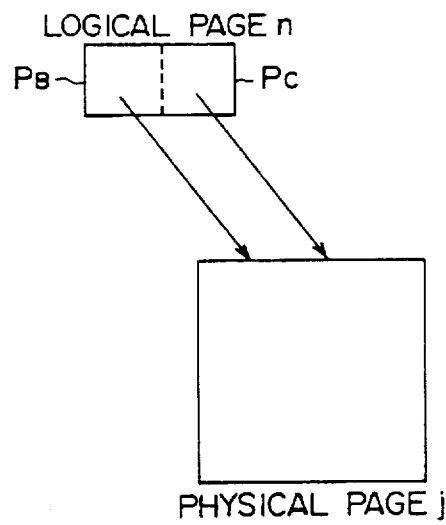
Figure 2:
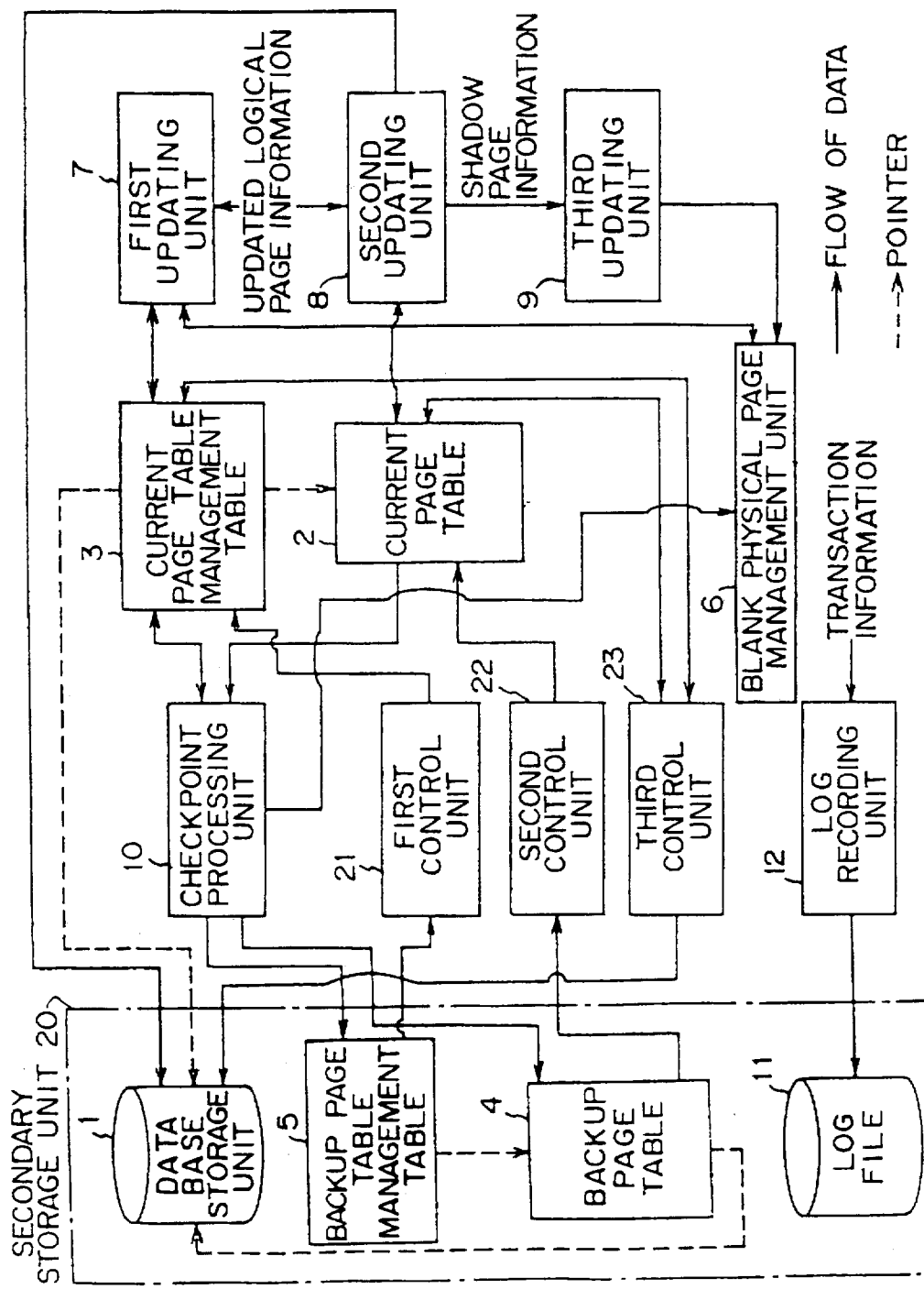
FIG. 2 is for explaining the principle of the present invention.

The principle of the present invention is described below by referring to FIG. 2.

The present invention is based on a data base management system in which data are stored in a plurality of logical areas, that is, logical pages.

According to the first principle, the present invention comprises each of the following components.

A data base storage unit 1 is provided in the secondary storage unit 20 and stores data of a data base after dividing them into physical pages corresponding one-to-one to logical pages.

All or most of a current page table 2 is provided in the main storage unit and manages the position information in the data base storage unit concerning the latest physical page storing the latest updated data and the shadow physical page storing the data before the latest update.

All or most of a current page table management table 3 is provided in the main storage unit and manages as a shadow page table the current page table whose backup data are copied when a checkpoint is recorded, and manages the current page table updated after the checkpoint as the latest page table.

A backup page table 4 is provided in the secondary storage unit 20 and stores the data in the current page table 2 when a checkpoint is recorded.

A backup page table management table 5 is provided in the secondary storage unit 20, and is used when the data base recovers from a failure. The management table 5 stores the data in the page table. The page table stores the information about a position on a physical page in the secondary storage unit 20 which stores data required to restore each logical page to its state before the failure.

A blank physical page management unit 6 is preferably provided in the main storage unit and manages unused physical pages in the secondary storage unit 20.

When data on a logical page are updated as a result of an execution of a transaction, a first updating unit 7 first accesses the current page table management table 3. If no shadow page tables exist in the page table containing the position information about the physical page corresponding to the logical page, the first updating unit 7 refers to the management information of the blank physical page managing unit 6, obtains a currently unused physical page copies data in the latest page table to the physical page, and enters the copied data in the management table 3 as the latest page table for the logical page. The copied-from latest page table is entered in the current page table management table 3 as a shadow page table. Then, the newly-obtained physical page is set in the blank physical page management unit 6 as a physical page being used.

Next, position information about the physical page corresponding to the logical page in the current page table 2 is checked according to the management information in the current page table management table 3. If the position information indicates that no physical shadow page exists corresponding to the logical page, then the first updating unit 7 refers to the management information in the blank physical page management unit 6, obtains a currently unused physical page from the data base storage unit 1, and enters in the current page table 2 the physical page as the latest physical page corresponding to the logical page.

A second updating unit 8 refers to the current page table 2 which has been updated by the first updating unit 7, and writes the updated data on the logical page to the latest physical page corresponding to the logical page whose data are stored in the current page table 2 and should be updated. Then, it changes the position information pointing to the shadow page corresponding to the logical page in the current page table such that the information indicates the latest physical page.

A third updating unit 9 sets as an unused page the shadow page in the blank physical page management unit 6.

A checkpoint processing unit 10 changes the data in the current page table management table in the main storage unit such that it indicates that only the latest page table is valid. The undated data are copied to the backup page table management table 5 in the secondary storage unit, and the data in the current page table 2 in the main storage unit are copied to the backup page table in the secondary storage unit.

The management information of the blank page management unit 6 can be changed such that all physical pages which stored the shadow page table deleted in the current page table management table 3 are managed as having being unused.

The above described updating unit 7, the second updating unit 8, the third updating unit 9, and the checkpoint processing unit 10 are realized by, for example, a host computer, a DBMS (data base management system) operated in a server of a client/server system, or a middleware such as a TP monitor (transaction processing monitor).

The current page table management table 3 can be designed to comprise a first pointer pointing to a shadow page table and a second pointer pointing to the latest page table.

With this configuration, the shadow page table and the latest page table comprise a plurality of physical pages, and the first and the second pointers point to the physical pages.

Also with this configuration, the current page table management table 3 can be designed to manage the first and the second pointers using respective tables.

The current page table 2 can be designed to refer to each logical page using a first pointer indicating a shadow physical page and a second pointer indicating the latest physical page.

Furthermore, with this configuration, the current page table 2 can be designed to manage the first and second pointers using respective tables.

Each logical page of the current page table 2 can be preliminarily assigned two physical page groups in the secondary storage unit 20. The current page table management table 3 has two flags fixedly assigned to respective physical pages corresponding to each logical page in the current page table. With this configuration, the two flags corresponding to the physical pages can be designed to be set to values indicating whether they belong to the shadow page table or the latest page table.

With this configuration, the bit amount for the position information indicating the shadow page table and the latest page table of the current page table management table 3 can be defined as 1 bit for each logical page, thus quickly performing a checkpoint process.

Furthermore, two backup page table management tables 5 can be provided in the secondary storage unit 20, and the checkpoint processing unit 10 can copy the data in the current page table management table 3 to the two-page table management tables 5.

With this configuration, an update flag can be provided in the secondary storage unit 20, and the checkpoint processing unit 10 sets the above described update flags while copying the data in the current page table management table 3 to the page table management table 5 which is subject to a write process later. The update flag can be reset after the data are copied.

Two backup page table management tables 5 can be provided in the secondary storage unit 20, and the checkpoint processing unit 10 can alternately use them as the backup page table management tables 5 to which the data of the current page table management table 3 are copied.

Additionally, two backup page tables 4 are provided in the secondary storage unit 20, and the checkpoint processing unit 10 can copy the data of the current page table 2 to the two page tables.

In this case, an update flag is provided in the secondary storage unit 20, and the checkpoint processing unit 10 sets the above described update flags while copying the data in the current page table management table 3 to the page table which is subject to a write process later. The update flag can be reset after the data are copied.

Furthermore, two backup page tables can be provided in the secondary storage unit 20, and the checkpoint processing unit 10 alternately uses the two page tables as the backup page table 4 to which data of the current page table 2 are copied.

In addition to the data base storage unit 1, the current page table 2, the current page table management table 3, the backup page table 4, the backup page table management table 5, and the checkpoint processing unit 10 according to the first principle of the present invention, the embodiment according to the second principle further comprises the following components.

A log file 11 is provided in the secondary storage unit 20 and stores log information about each transaction.

A log recording unit 12 writes the log information about each transaction to the log file 11 at the completion of each transaction.

Like the checkpoint processing unit 10, the log recording unit 12 can be realized by a host computer, a DBMS in a server, a TP monitor, etc.

With this configuration, the log information about each transaction stored in the log file 11 can comprise at least a flag indicating the start of a transaction, an identifier uniquely assigned to a transaction, history information about a data base operation for a transaction, and a flag indicating the end of a transaction.

The history information about the data base operation of a transaction can comprise at least a set of information indicating the type of data base operation, information indicating a logical page on which the data base operation was performed, information indicating the physical page on which data before the latest update on the logical page are stored, and information indicating the physical page on which updated data on the logical page are stored. The set of information can be recorded in time series for operations executed in the transaction and associated with the update of all data bases.

In addition to the data base storage unit 1, the current page table 2, the current page table management table 3, the backup page table 4, the backup page table management table 5, the checkpoint processing unit 10, the log file 11, and the log recording unit 12 according to the second principle of the present invention, the embodiment according to the third principle further comprises the following components.

When a system failure occurs, a first control unit 21 reads the backup page table management table 5 from the secondary storage unit 20, and copies the data in the backup page table management table 5 to the current page table management table 3.

When a system failure occurs, a second control unit 22 reads the backup page table 4 from the secondary storage unit and changes the data in the backup page table 4 such that, in the position information about a logical page, a corresponding physical page indicates only a shadow physical page if the corresponding physical page indicates a shadow physical page and the latest physical page. The resultant data in the page table are copied to the current page table 2.

According to the current page table management table 3 generated by the first control unit 21, the current page table 2 generated by the second control unit 22, and the log information stored in the log file 11, a third control unit 23 restores the data base in the data base storage unit 1 to the completion state of the transaction by reprocessing a transaction being processed when a checkpoint is recorded and having been completed when the system failure arises and reprocessing a transaction executed after the checkpoint and having been completed before the occurrence of the system failure.

The first control unit 21, the second control unit 22, and the third control unit 23 can be realized by operating a DBMS and a TP monitor in a host computer and server.

According to the first principle of the present invention, the latest data base stored in the data base storage unit 1 is managed by the current page table management table 3 and the current page table 2.

The current page table 2 manages all logical pages forming a data base. That is, during the update of a logical page, it manages a shadow page of the logical page and the position information about the latest physical page. When the updated data of the logical page have been written to the latest physical page, the shadow page is changed such that it indicates the position information about the latest physical page.

The shadow page and the latest physical page are generated in the data base storage unit 1.

The data on the logical page are updated while the second updating unit 8 refers to the current page table 2. That is, the second update unit 8 refers to the current page table 2 to obtain position information about the latest physical page corresponding to the logical page and write to the latest physical page the updated data on the logical page. After the data on the logical page have been normally updated, the second updating unit 8 changes the position information about the shadow page corresponding to the logical page in the current page table 2 such that it indicates the latest physical page.

The current page table management table 3 manages the current page table 2 by the shadow page system. That is, when a checkpoint is recorded and during the succeeding checkpoint period, the current page table 2 manages a shadow page table and the latest page table as the page tables for storing the position information about the shadow page and the latest physical page corresponding to each logical page in the data base. During the period, the current page table management table 3 manages the two page tables.

The shadow page table managed by the current page table 2 is deleted by the checkpoint processing unit 10. That is, the checkpoint processing unit 10 changes the management information data in the current page table management table 3 when it records a checkpoint such that the management information indicates only the latest page table in the current page table 2. Thus, the shadow page table is deleted.

On the other hand, the first updating unit 7 generates a shadow page table. That is, the first updating unit 7 first accesses the current page table management table 3 when data on a logical page are updated as a result of a processing of a transaction. If no shadow table exists for a page table containing the position information about the physical page corresponding to the logical page, then it refers to the management information of the blank physical page management unit 6, and obtains a currently unused physical page. Then, the data in the latest page table are copied to the physical page, and the resultant physical page is entered to the current page table management table 3 as the latest page table for the logical page. The second latest updated page table is entered to the current page table management table 3 as a shadow page.

The first updating unit 7 also generates a shadow physical page corresponding to each logical page in the current page table 2. That is, the first updating unit 7 defines the newly obtained physical page as being used in the blank physical page management unit 6. Then, it checks the position information about the physical page corresponding to the logical page in the current page table 2 according to the management information of the current page table management table 3. If, according to the information, no shadow physical page exists corresponding to the logical page, then the first updating unit 7 refers to the management information of the blank physical page management unit 6, obtains a currently unused physical page from the data base storage unit 1, and enters it to the current page table 2 as the latest physical page corresponding to the logical page.

At this time, the first updating unit 7 does not change the position information for the shadow physical page pointing to the second latest physical page. Thus, the position information for the shadow physical page points to the shadow physical page. That is, the second latest physical page becomes a shadow physical page.

The checkpoint processing unit 10 records a checkpoint. That is, the checkpoint processing unit 10 changes the data in the current page table management table 3, copies the change result to the backup page table management table 5 in the secondary storage unit, and copies the data in the current page table 2 in the main storage unit to the backup page table 4 in the secondary storage unit 20.

That is, in the checkpoint process, only the position information in the current page table management table 3 is changed, and the position information about the current page table 2 is not changed. Accordingly, current page table management table 3 has the position information pointing to only the latest page table in the current page table 2. On the other hand, the current page table 2 holds the position information about a shadow physical page and the latest physical page corresponding to the logical page updated by a transaction at a checkpoint. The data of the tables 2 and 3 are copied to the backup page tables 4 and 5 in the secondary storage unit.

Thus, according to the present invention, a shadow page is not deleted when a checkpoint is recorded, and the data in the current page table 2 are copied to the backup page table 4 in the secondary storage unit.

Therefore, a transaction can be processed when a checkpoint is recorded. That is, the checkpoint can be recorded during the process of the transaction. The position information can be changed in the current page table management table 3 whose information amount is smaller than the information amount of the current page table 2. Thus, the checkpoint process can be performed at a high speed.

According to the second principle of the present invention, the log recording unit 12 records the log information about a transaction in the log file 11 generated in the secondary storage unit when the transaction is completed.

Thus, as described later, a transaction which was being processed when a checkpoint was taken can be re-executed at the occurrence of a system failure.

Furthermore, in addition to all the above listed functions, the following operations are performed at the occurrence of a system failure according to the third principle of the present invention.

That is, if a system failure has arisen, the first control unit 21 reads the backup page table management table 5 from the secondary storage unit 20, and copies the data in the backup page table management table 5 to the current page table management table 3.

Then, the second control unit 22 reads the backup page table 4 from the second storage unit 20 and changes the data in the backup page table 4. That is, if the position information of a logical page points to a shadow physical page and the latest physical page, then the second control unit 22 changes the data such that they point to only the shadow physical page, and copies the resultant data in the page table to the current page table 2.

According to the current page table management table 3 generated by the first control unit 21, the current page table 2 generated by the second control unit 22, and the log information stored in the log file 11, a third control unit 23 restores the data base in the data base storage unit 1 to the completion state of the transaction by reprocessing a transaction being processed when a checkpoint is recorded and having been completed when the system failure arises and reprocessing a transaction executed after the checkpoint and having been completed before the occurrence of the system failure.

If a shadow physical page and the latest physical page exist as the position information about the physical page corresponding to a logical page in the backup page table 4, then the position information should refer to that about the shadow physical page. As clearly explained above, the logical page was updated before a checkpoint by a transaction being processed when the checkpoint was recorded. Therefore, the data base is restored to the state before the transaction. If the transaction has been completed before the system failure occurs, the transaction is re-executed according to the log information about the transaction stored in the log file 11. Thus, the data base recovers its data including the transaction execution result. If a transaction is executed after the above described transaction and it has been completed before the system failure occurs, then it is executed according to the log information stored in the log file 11. Accordingly, the data base recovers its state before the system failure. As described above, a checkpoint can be recorded during the execution of a transaction, thereby reducing the amount of log used in a data base recovery process and performing a high-speed recovery process by setting an optimum checkpoint interval.

The preferred embodiments of the present invention based on the above described principles are explained below by referring to the attached drawings.

Figure 3:
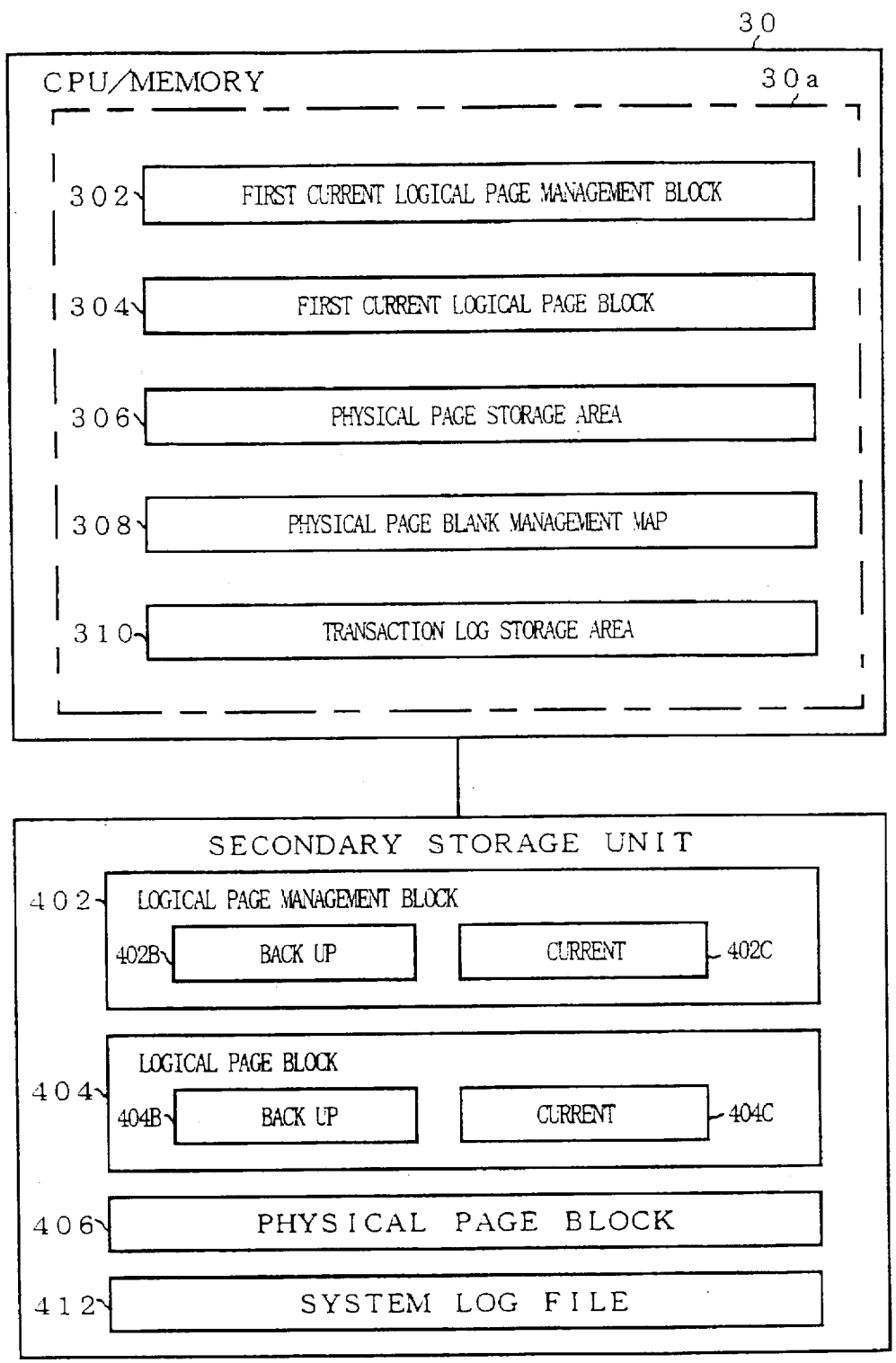
FIG. 3 is a block diagram showing the configuration of the system according to its first embodiment.

FIG. 3 shows the configuration of the hardware of the data base system according to the embodiment of the present invention.

In FIG. 3, a CPU/memory 30 is a CPU board comprising a CPU (central processing unit) (not shown in FIG. 3) having a microprocessor and a memory 30a having a high-speed access RAM (random access memory) including, for example, a main storage unit connected to the CPU via a local bus not shown in FIG. 3.

The CPU/memory 30 is connected to a secondary storage unit 40 of a large-capacity DASD (direct access storage device) such as magnetic disc, optomagnetic disc, etc. via, for example, a system bus.

The CPU operates and manages a data base according to the present system by executing a DBMS (data base management system) loaded to the main storage area of the memory The memory 30a is provided with a first current logical page management block 302, a first current logical page block 304, a physical page 306, a physical page blank management map 308, and a transaction log storage area 310.

Described below is the internal formats and the functions of the first current logical page management block 302, the first current logical page block 304, the physical page 306.

The first current logical page block (current page table) 304 is a page table for storing using a pointer the latest information about the correlation between a logical page in a logical data base area and a physical page in a physical data base area stored in the secondary storage unit 40. It is composed of a plurality of page frames (blocks) 3041 in the memory 30a. Each page frame 3041 has a pointer to two new and old physical pages corresponding to each logical page (FIG. 5B). The old pointer points to the latest physical page (slot) on which data are normally updated corresponding to the logical page. If data are being updated on the logical page, the new pointer points to a physical page which is newly assigned to the logical page and on which data are being updated. Unless data are being updated on the logical page, the new pointer points to a physical page which stores the latest data of the logical page. Therefore, if data are being updated on the logical page, the old pointer points to a shadow page. When the data update normally terminates, the new and old pointers point to the same latest physical page. The pointers are, for example, 2 bytes long.

Each of the page frames 3041 is assigned a data length applicable to the block unit for transmission to and from the secondary storage unit 40.

FIG. 5A shows the configuration of the first current logical page management block 302 (current page table management table) (FIG. 5A).

As shown in FIG. 5A, the first current logical page management block 302 associates all logical pages (0~ni-1 where n and i are natural numbers) in the data base with the page frames 3041 in the logical page block 304 using two (new and old) page table pointers to a corresponding page frame.

Each time a data update request is issued to a logical page, a new page frame 3041 for storing pointer information pointing to a physical page corresponding to the logical page is reserved in the first current logical page block 304. The address information pointing to the new page frame 3041 is set in the new page table pointer. The new page table pointer is copied to the old page table pointer when a checkpoint is recorded as described later. Therefore, if data of a logical page are updated (including the update of data on the other logical page storing new and old pointers in the same page frame 3041) between two serial checkpoints, the two new and old page table pointers in the first current logical page management block 302 are different from each other and made to match when a checkpoint is recorded. The pointer is, for example, four bytes long.

FIG. 6 shows the configuration of the current physical page blank management map 308.

The map 308 has two (new and old) flags indicating the state as to whether or not a physical page in the secondary storage unit 40 is being used as a data storage area. These flags are set to a value "blank" or "occupied". That is, if valid data are stored, an "occupied" flag is set. If a physical page is unused or invalid data are stored, then a "blank" flag is set. The new flag indicates the latest use state, and the contents of the new flag is copied to the old flag when a transaction terminates. That is, when a transaction terminates, the two (new and old) flags match. When data are updated corresponding to a logical page during the execution of a transaction, a new physical page should be obtained by referring to the new flag. That is, a new physical page is obtained from the physical pages for which both new and old flags are set to "blank". On the other hand, if both new and old flags are set to "occupied", then the old flag implies a shadow page.

FIG. 7 shows the configuration of the transaction log storage area 310.

The area 310 stores a page update table journal 3101 in time series. The journal is information relating to a data base update process performed by each transaction. As shown in FIG. 7, the page update table journal 3101 contains information about the type of operation, a logical page, an old physical page, a new physical page, etc. The above listed information includes the following data.

Type of operation: Various data base operations such as "update", "generation", "deletion", etc. performed on a logical page.

Logical page: a page processed by each of the above listed operations

Old physical page: a physical page for storing old data before update

New physical page: a physical page for storing new data after update

A transaction log in a transaction is a history of the page update table journal 3101, and should be stored in the main storage unit in the transaction. The log can be stored in the secondary storage unit 40 normally to save a main storage area.

The physical page storage area (data base buffer) 306 is an area in which a physical page used in reading data from the secondary storage unit is loaded. Data are updated in the area 306. The area 306 stores a predetermined number of physical pages and data are paged-in and paged out between the area and the secondary storage unit 40 according to the algorithm such as LRU (least recently used), etc.

Since the storage capacity of the memory 30a is limited, some systems require a swap-in and swap-out of a part of the first current logical page management block 302, first current logical page block 304, and a physical page with the secondary storage unit 40.

Figure 4:
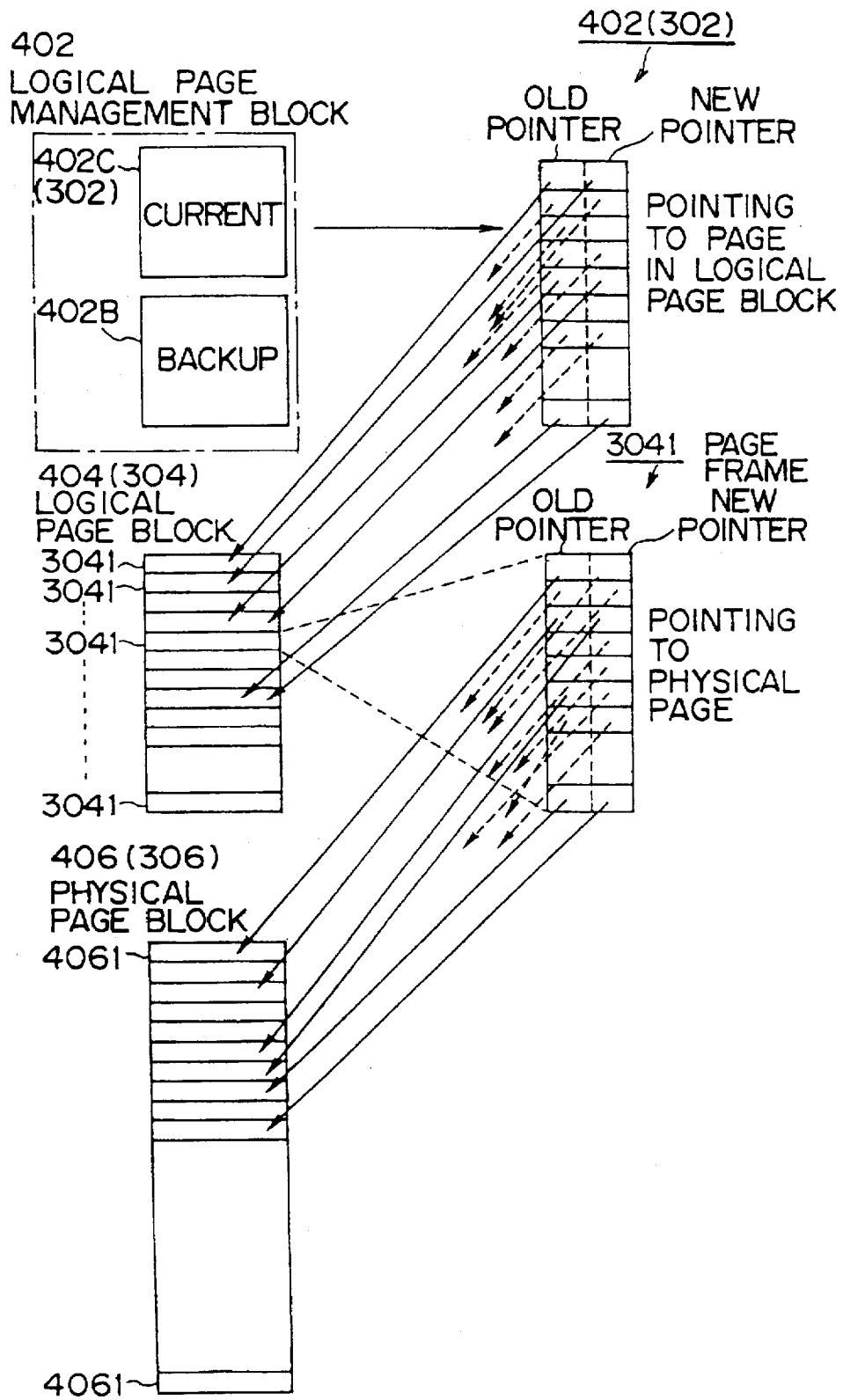
FIG. 4 shows the configurations of the logical page management block, the logical page block, and the physical page lock, and the link correlation between them.

In the secondary storage unit 40, a physical page block (data base storage unit) 406 is provided with a plurality of physical pages 4061 as shown in FIG. 3, and is a fixed-length block generally called a "slot" (FIG. 4). The physical page block 406 stores actual data of a data base.

Also in the secondary storage unit 40, each of a logical page management block and a logical page block has two (current and backup) versions. They are shown in FIG. 3 as a logical page management block (backup page table management table) 402 and a logical page block (backup page table) 404.

Since the data size of the first current logical page management block 302 is small, it resides in the main storage unit for a high-speed process. In a normal process, no data are written to the secondary storage unit 40. However, when a checkpoint is recorded, the data in the first current logical page management block 302 should be copied to a backup logical page management block 402B. At this time, the data are not written directly to the backup logical page management block 402B, but to a second current logical page management block 402C. If the data have been written to the block, they are also written to the backup logical page management block 402B. This prevents the data in the first current logical page management block 302 in the memory 30a from being lost, and the data in the backup logical page management block 402B in the secondary storage unit 40 from becoming incomplete when a system failure arises due to the disconnection of a power source during checkpoint process.

Likewise, the logical page block 404 in the secondary storage unit 40 has both backup and current versions. When a checkpoint is recorded, the data in the first current logical page block 304 in the memory 30a are copied to the backup logical page block 404. If the data size of the first current logical page block 304 is too large to be loaded to the memory 30a, the second current logical page block 404 in the secondary storage unit 40 can be used as a swapping area.

Figure 8:
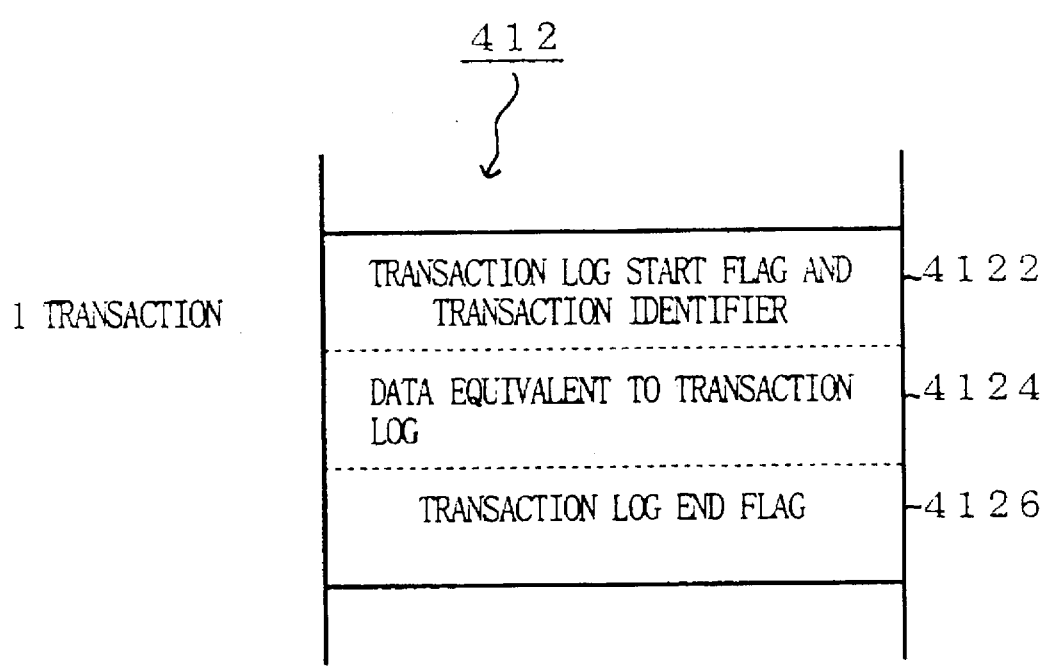
FIG. 8 shows the format of a log stored in the system log file.

A system log file 412 is generated in the secondary storage unit 40 and stores system log information for failure recovery. FIG. 8 shows the data in the file 412.

FIG. 8 shows the format of the log information about a transaction. First stored is first information 4122 comprising a flag indicating the start of the log of the transaction and a transaction identifier. Then stored is second information 4124 containing the same contents as the transaction log (shown in FIG. 7) written in the above described transaction log storage area 310 in the memory 30a. Finally stored is a transaction log end flag 4126 indicating a normal termination of the transaction. In the system log file 412, these three types of information 4122, 4124, and 4126 are generated for all normally terminated transactions and stored in the system log file 412 in the order of normal termination.

Described below is the operation of the system with the above described configuration.

Figure 9:
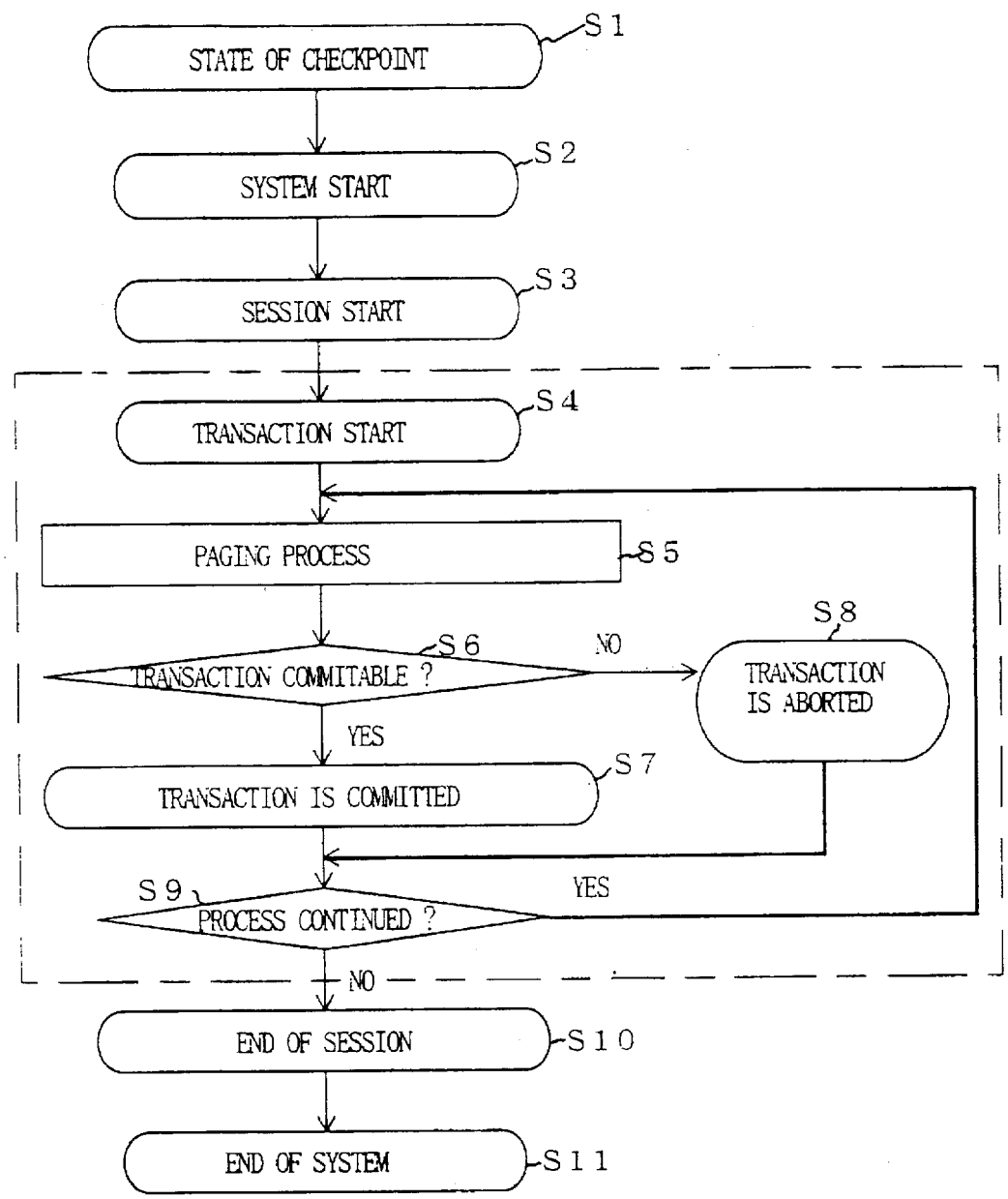
FIG. 9 is a flowchart showing the operation of the entire system.

First, the process of the entire system is described by referring to the flowchart shown in FIG. 9.

A checkpoint is recorded when the previous system process is completed, and the system starts (step S2) from the state in which the checkpoint is recorded (step S1).

A user can start a session (step S3) by logging in from his or her terminal unit through a circuit. The system enables a plurality of users to start their sessions simultaneously.

Each time a transaction execution request is received from a user who has started a session, the DBMS performs a paging process required by the transaction in association with a data base (steps S4 and S5).

A system failure may arise in the paging process in step S4. Therefore, the DBMS determines whether the transaction should be committed or aborted (step S6) depending on the existence of a system failure.

If no system failure has arisen and a commit instruction is issued from a process being executed in the transaction, then the DBMS determines that the transaction should be committed (yes in step S6), and then performs a transaction commission process (step S7).

In the transaction commission process in step S7, the following operations are required.

1. An updated physical page stored in the physical page storage area 306 and not yet written to the physical page in the secondary storage unit 40 is written to the physical page block 406. The write can be performed when the physical page storage area 306 overflows as described later or when a checkpoint is recorded. Thus, the transaction commission process can be improved in response.

With regard to the logical page updated in the transaction, the old pointer in the first current logical page block 304 in the memory 30a should point to what is pointed to by the new pointer. That is, the old pointer currently pointing to a shadow page is processed to point to a new physical page storing the latest data. Then, the physical page blank management map 308 is rewritten such that the shadow page previously pointed to by the old pointer is defined as being unused.

2. The transaction log 4124 written to the transaction log storage area 310 during the paging process is output to the system log file 412 in the secondary storage unit 40. At this time, the transaction log start flag and the transaction identifier 4122 and the transaction log end flag 4126 are respectively written before and after the transaction log 4124 as shown in FIG. 8 (output of system log). Then, the point at which the system log has been completely written to the system log file 412 is the transaction commission point.

When the processes 1 and 2 are performed in this order, some pages are defined as being unused with the transaction remaining uncommitted. In this case, these pages can be used by other transactions. Therefore, the processes should be performed in the order from 2 to 1.

On the other hand, the DBMS performs a transaction abortion process in step S8 by determining that the transaction should be aborted (no in step S6) when a system failure arises during the execution of the paging process in step S5.

In the abortion process in step S8, with regard to the logical page updated in the paging process in step S5, the new pointer in the first current logical page block 304 in the memory 30a is processed such that it points to what is pointed to by the old pointer. Thus, the paging process is nullified. Thereby, the shadow page becomes the latest physical page again. Then, the physical page blank management map 308 is rewritten such that the physical page previously pointed to by the new pointer is defined as being unused.

After the processes in step S7 or S8, it is determined whether or not the processes in steps S4 through S8 are to be continued in accordance with the entry state of a log-off command from a user (step S9). If the command has not been entered, control is returned to step S4 and the next transaction is waited.

If a user enters a log-off command, a predetermined session termination process is performed for the user (step S10).

Thus, the system administrator performs the system termination process to stop the system. At this time, a checkpoint is recorded before stopping the system (step S11).

Described below is the paging process in step S5.

The important processes in step S5 are a page reference process and a page update process.

Figure 10:
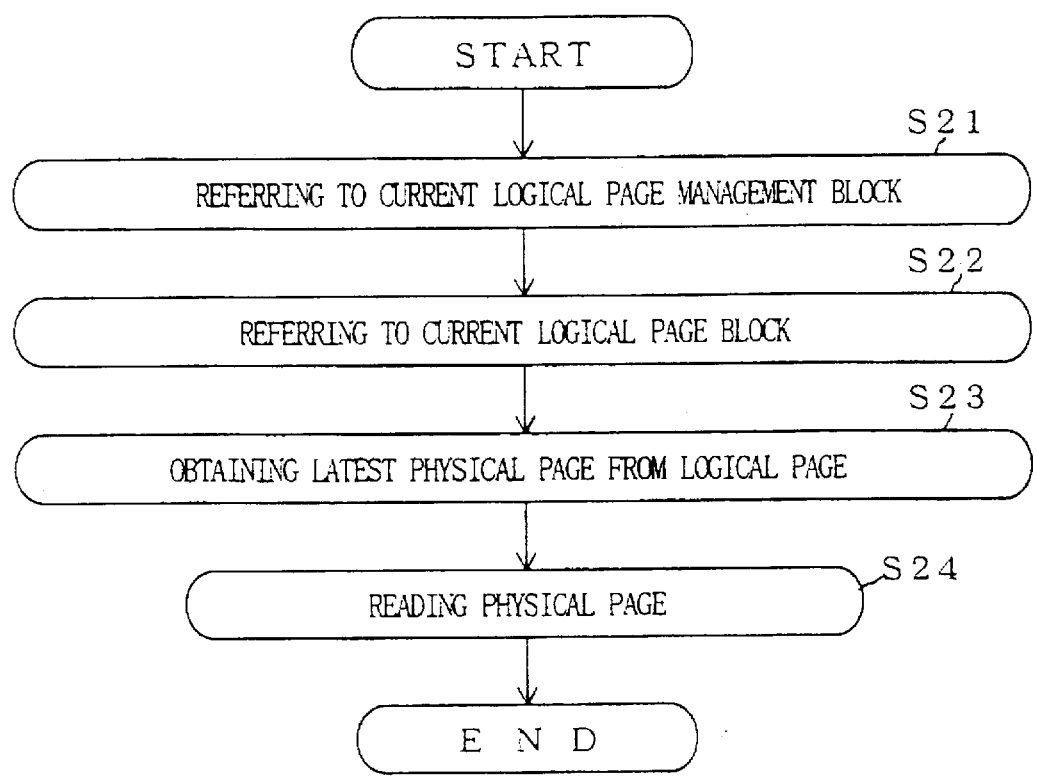
FIG. 10 is a flowchart showing the page reference process.

First, the page reference process is described by referring to the flowchart shown in FIG. 10.

If a logical page data reference request is issued from an application program, then the DBMS refers to a new page table pointer corresponding to the logical page in the first current logical page management block 302 in the memory 30a (step S21).

Then, referred to is the page frame 3041 pointed to by the new page table pointer in the first current logical page block 304 (step S22).

Obtained is a physical page corresponding to the logical page according to the new pointer corresponding to the logical page in the page frame 3041 (step S23).

Then, the physical page is read from the physical page block 406 in the secondary storage unit 40, and is loaded to the physical page storage area 306 in the memory 30a. The physical page is returned to the above described application program (step S24).

In the page reference process, the data in a specified logical page are referred to, and those in the physical page corresponding to the logical page are not changed. Accordingly, the data (values associated with all new and old pointers) are not changed in both first current logical page management block 302 and first current logical page block 304.

Figure 11:
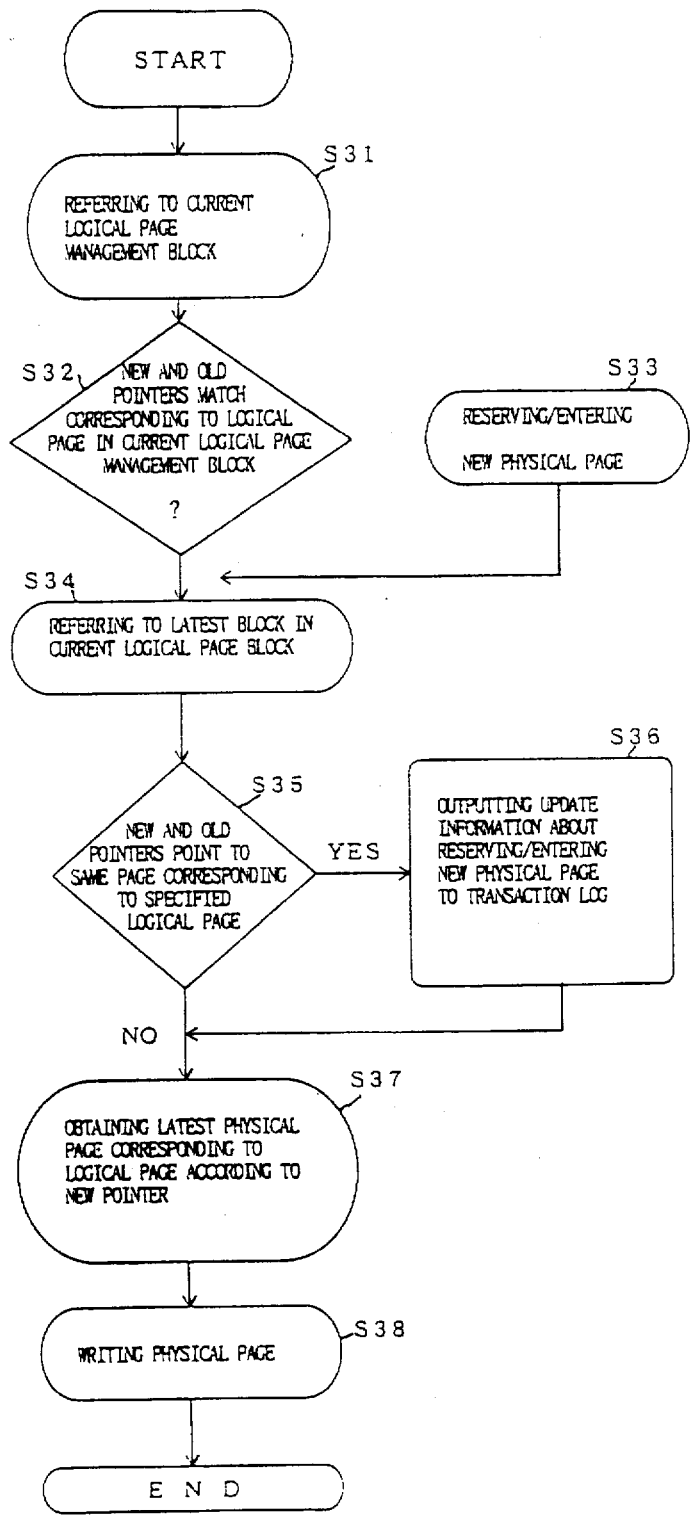
FIG. 11 is a flowchart showing the page update process.

Then, the page update process in which a logical page data are updated is described in detail by referring to the flowchart shown in FIG. 11.

In the process, the new and old page table pointers corresponding to the specified logical page in the first current logical page management block 302 are compared and referred to (step S31), and it is determined whether or not the two pointers match (step S32).

If the two pointers match each other (yes in step S32), then the physical page blank management map 308 is referred to so that a new physical page can be reserved from among unused physical pages. Then, the block (page frame 3041) in the first current logical page block 304 pointed to by a new pointer in the first current logical page management block 302 is copied to the reserved physical page (step S33).

As explained later, all the new and old pointers in the first current logical page management block 302 are set to the same value when a checkpoint is recorded (the data pointed to by the new pointer are copied such that they are pointed to by the old pointer). Therefore, in step S 32, the matching pointers indicate that the logical pages (to be precise, all logical pages in the logical page group whose new and old pointers to the corresponding physical page are stored in the same page frame 3041) have not yet been updated. In this case, with an issue of the first page update request after a checkpoint as a trigger, a new page frame 3041 is generated in which new and old pointers point to the physical page corresponding to the specified logical page. The old page frame 3041 is managed as a shadow page.

The new and old pointers corresponding to the specified logical page in the new page frame 3041 are compared and referred to (step S34).

On the other hand, in step S32, if the two values of the new and old page table pointers do not match (no in step S32), then the process in step S34 is performed on the page frame 3041 in the first current logical page block 304 pointed to by the new page table pointer.

As clearly explained above, if the new and old page table pointers do not match each other in the first current logical page management block 302, then the data have been updated in the specified logical page (to be exact, at least one logical page in the above described logical page group) after a checkpoint process. Therefore, in this case, an old page frame 3041 (3041_OLD) functioning as a shadow page to the new page frame 3041 (3041_NEW) already exists. Since the shadow page has already been generated (step S33), control is returned to the process in step S34.

After the process in step S34, it is determined whether or not the new and old pointers corresponding to the specified logical page in the latest page frame 3041_NEW match each other (step S35).

As described above, the first data in the latest page frame 3041_NEW generated in step S33 are the same as those in the old page frame 3041_OLD, that is, a shadow page. Accordingly, if the specified logical page has never been updated in the present transaction, then the new and old pointers corresponding to the logical page in the latest page frame 3041_NEW remain coincident with each other. In the present embodiment, each page frame 3041 in a page table, that is, the first current logical page block 304, is managed by the shadow page system. Therefore, in step S35, if the new and old pointers pointing to the physical page corresponding to the specified logical page match each other, the physical page blank management map 308 is referred to and an unused physical page (a new physical page) is reserved in the physical page block 406 in the secondary storage unit 40 to set the physical page pointed to by the old pointer (the old physical page) as a shadow page. Then, the address information about the new physical page is set as a new pointer in the latest page frame 3041_NEW. At this time, transaction information is generated in the format shown in FIG. 8, and is written to the transaction log storage area 310 in the memory 30a (step S36).

After the process in step S35 or S36, the new pointer in the new page frame 3041_NEW is referred to so that a pointed-to physical page (the latest physical page) in the physical page block 406 can be selected in the secondary storage unit 40 (step S37).

Then, the latest physical page in the secondary storage unit 40 is stored in the physical page storage area 306 in the memory 30a, and the updated data are written to the physical page. If the physical page storage area 306 has overflowed or stored physical update pages has reached a given level, then the physical update pages are written to the physical page block 406 in the secondary storage unit 40 (step S38).

Figure 12:
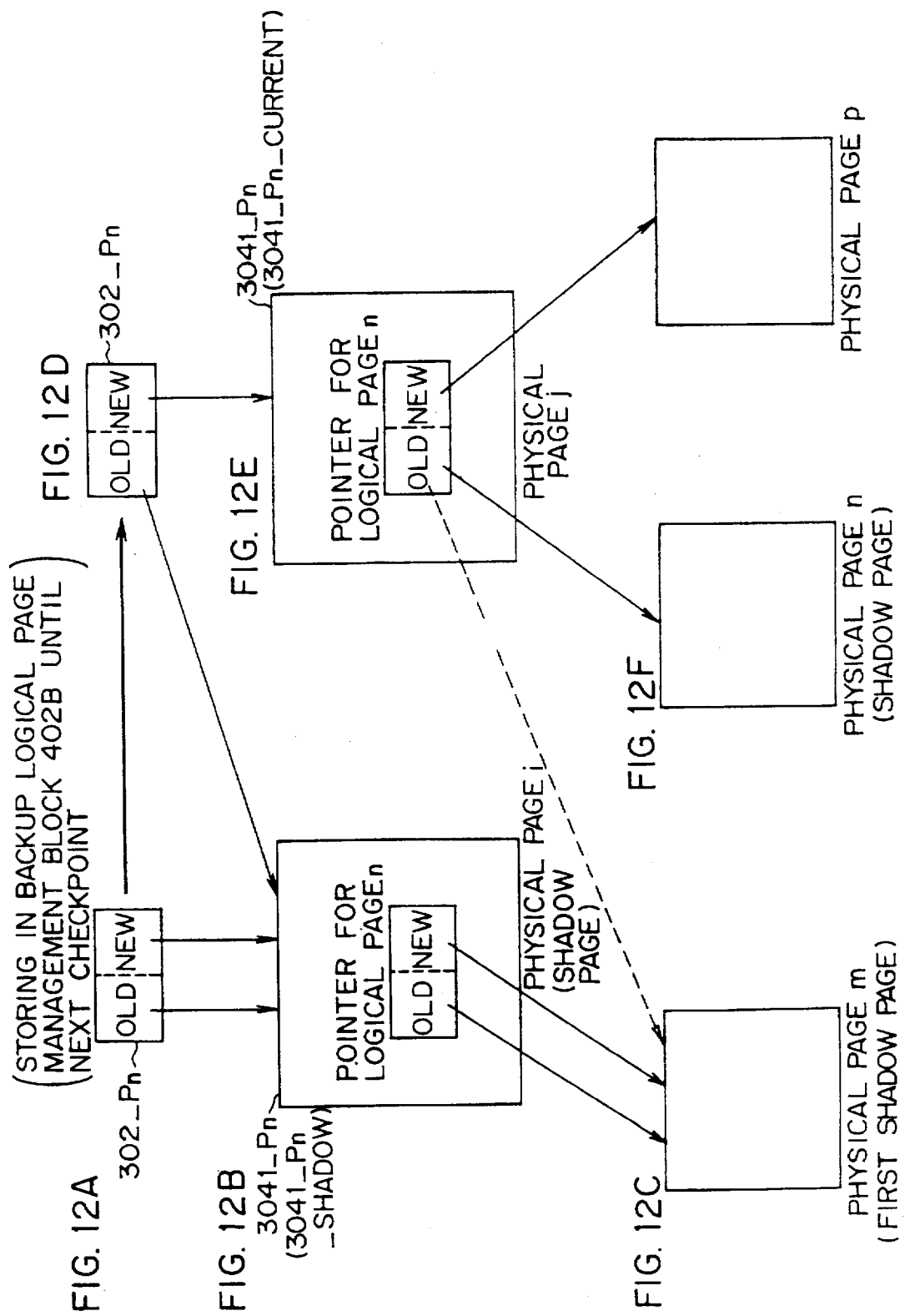
FIGS. 12A through 12F show the page update process.

FIG. 12 shows the page update process shown by the flowchart in FIG. 11.

It shows an example of updating data in logical page n.

In a checkpoint process, the new and old page table pointers 302_Pn pointing to the page frame 3041_Pn which stores the new and old pointers for the logical page n in the first current logical page management block 302 matches each other, and points to the page frame 3041_Pn, that is, the physical page i. In the page frame 3041_Pn, the new and old pointers for the logical page n point to the physical page m (FIGS. 12A, 12B, and 12C).

If the logical page n is updated by a transaction, then a new page frame 3041_Pn (3041_Pn_CURRENT) storing the new and old pointers for the logical page n is entered in an unused physical page j. The physical page J is set in a new pointer of the pointer 302_Pn. The old pointer is not changed (refer to FIGS. 12D and 12E). Now the physical page is a shadow page table. That is, the old page table for the logical page n entered by the physical page i becomes a shadow page table 3041_Pn_SHADOW. Afterwards, the page frame 3041_Pn_CURRENT entered in the physical page j linked with the new pointer of the above described pointer 302_Pn functions as the page frame 3041 for the logical page n.

In the current page frame 3041_Pn_CURRENT, the old pointer for the logical page n points to the previous physical page m as shown by the broken-line arrow from FIG. 4E and 4F to FIG. 4C after the logical page is first updated in a transaction. Then, each time a plurality of transactions update a physical page, the physical page pointed to by a new pointer is managed as a shadow page. Therefore, as shown in FIGS. 12E and 12F, when a plurality of transactions update the logical page n, the new and old pointers of the current page frame 3041_Pn_CURRENT respectively pointing to the shadow page of the logical page and the latest physical page respectively point to the physical pages n and p.

Thus, the feature of the present embodiment resides in that managed by the shadow page system are not only a physical page for storing actual data but also the first current logical page block 304, that is, a page table containing the mapping information about the physical page and the corresponding logical page. Accordingly, the first current logical page management block 302 is provided as a high order element for managing the first current logical page block 304. Access to a logical page is first made to the first current logical page management block 302.

Although not shown in the flowcharts, a similar operation is performed in the first current logical page management block 302, the first current logical page block 304, the physical page storage area 306, etc. in the memory 30a when a new logical page is generated or a logical page is deleted, and the transaction information is written to the transaction storage area 310.

Figure 13:
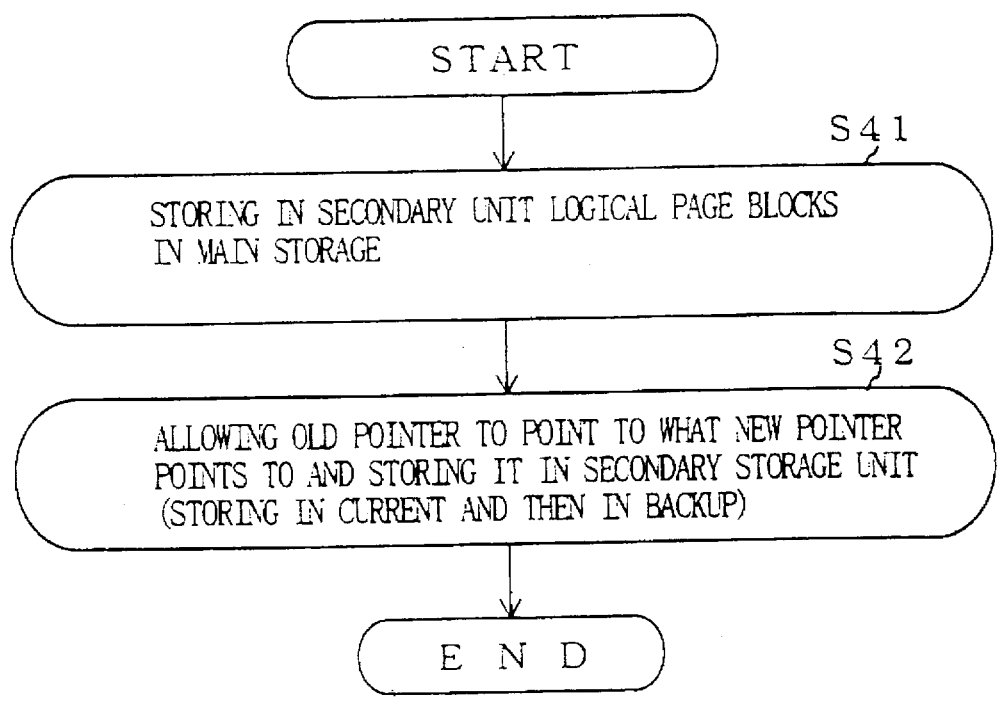
FIG. 13 is a flowchart showing a checkpoint process.

The operation performed on a data base when a checkpoint is recorded is described below by referring to the flowchart shown in FIG. 13.

A checkpoint process can be performed when a transaction is being executed and a logical page is being updated. That is, a checkpoint can be recorded at any time during the system operation.

In the process, the data in the first current logical page block 304 in the memory 30a are copied to the backup logical page block 404B in the secondary storage unit 40 by the above described method (Step S41).

Then, the data of old pointers of the first current logical page management block 302 in the memory 30a are processed to match the data of new pointers. When the processes are completed, the data in the first current logical page management block 302 are copied to the backup logical page management block 402B in the secondary storage unit 40. That is, the data are first copied to the second current logical page management block 402C and then to the backup logical page management block 402B so that the system can recover from a failure if it arises during the processes (step S42).

At the checkpoint, it is checked whether or not there is an updated physical page not written to the secondary storage unit 40 and remaining in the physical page storage area 306 in the memory 30a. If yes, it is written to the physical page block 406.

In the processes in steps S41 and S42, it is desirable that the data of the current versions of logical page management block 402 and the logical page block 404 in the secondary storage unit 40 are copied only for the updated blocks (page frame). To attain this, an update flag indicating whether or not data are updated after a checkpoint process can be provided for each block. By performing the copying process as described above on only the updated blocks by referring to the update flag, the amount of updated data can be reduced and the checkpoint process time can be greatly shortened.

As described above, the checkpoint process is performed while a transaction is processed. Therefore, if a transaction is not committed when a checkpoint is recorded, then the new and old pointers pointing to the physical page corresponding to the logical page updated by the transaction in the first current logical page block 304 point to different physical pages. That is, as shown in FIGS. 12E and 12F, the old pointer and the new pointer respectively point to a shadow page and the latest physical page.

Figure 14:
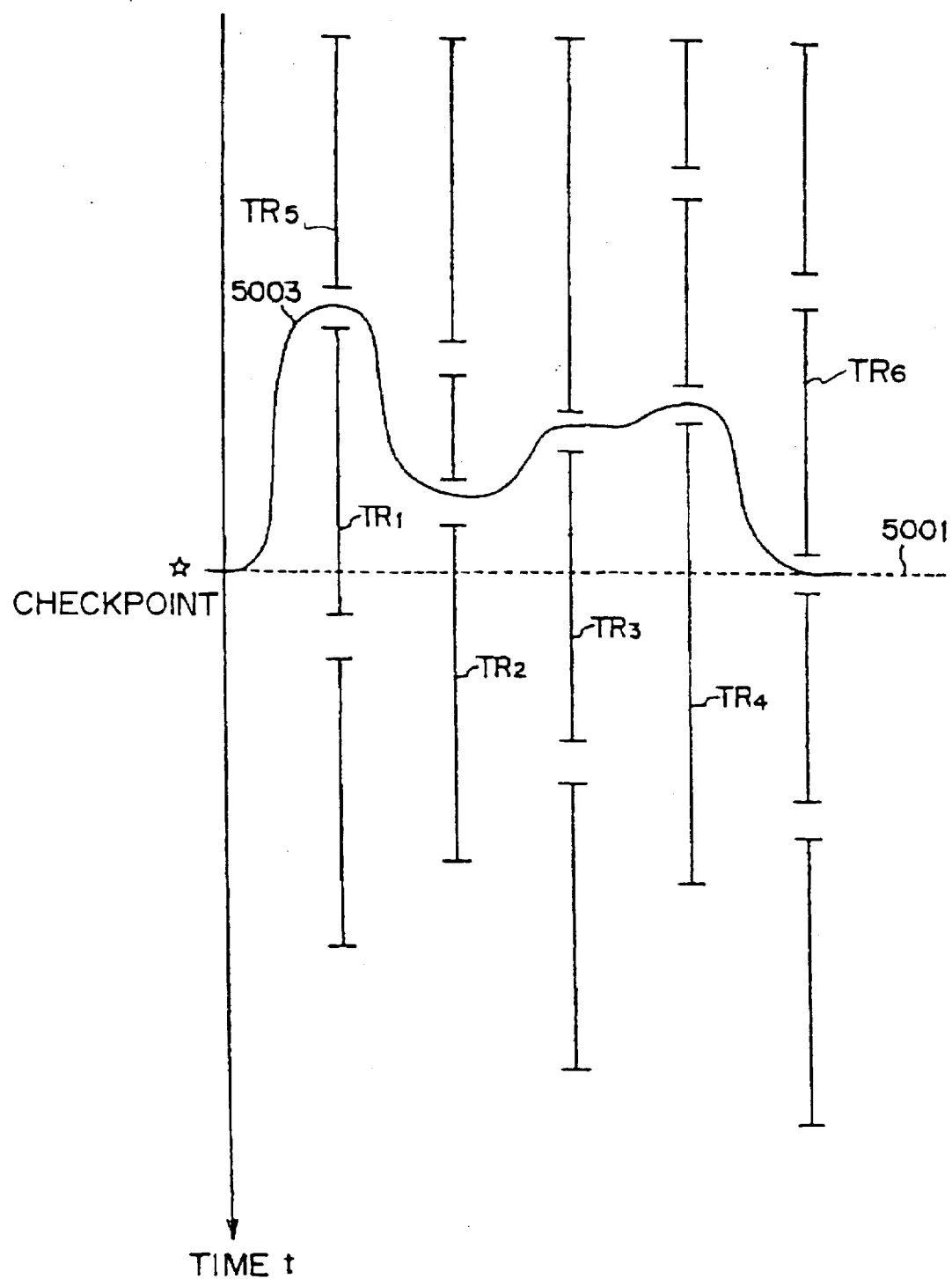
FIG. 14 shows the checkpoint process.

That is, when a checkpoint is recorded, a plurality of transactions $TR_1$, $TR_2$, $TR_3$, and $TR_4$ can be being processed as shown in FIG. 14. In FIG. 14, t indicates a time axis and the horizontal broken line 5001 vertical to the time axis t indicates a checkpoint.

In the present embodiment, the updated data in transactions $TR_5$, $TR_6$, etc. which have already been completed at the checkpoint 5001 are effectuated as in the conventional technologies. Therefore, these data are not subject to any recovery process even if a system failure arises before the next checkpoint. These transactions do not need the transaction log information stored in the system log file 412. As a feature of the present embodiment, transactions $TR_1$ through $TR_4$ which have already been completed before the next checkpoint being processed at the checkpoint 5001 are re-executed according to the transaction log information stored in the system log file 412 so that all process results can be effectuated even if a system failure arises before the next checkpoint.

This is attained by the recovery process shown by the flowchart in FIG. 15.

The operation of the above described recovery process performed to reconstruct a data base when a system failure arises is explained below by referring to the flowchart in FIG. 15.

In this process, it is determines which should be used, the backup version 402B or the current version 402C, as the logical page management block 402 for recovery by referring to a flag provided at a predetermined position in the secondary storage unit 40. The flag is set while the data in the first current logical page management block 302 in the memory 30a are written to the backup logical page management block 402. The flag is reset after the write.

As described above, the data in the first current logical page management block 302 are copied sequentially to the current version 402C and the backup version 402B. Since the write to the backup logical page management block 402B has normally terminates without the flag, the management block 402B is selected. On the other hand, if the flag is set, a system failure may arise during to write to the backup version 402B and the data in the backup version 402B may be destroyed. Therefore the second current logical page management block 402C is selected. Then, the data in the selected logical page management block 402B or 402C are copied to the first current logical page block 304 in the memory 30a (step S51).

Thus, the data in the first current logical page block 304 are restored to the state at the checkpoint.

Next, the data in the backup logical page block 404B in the secondary storage unit 40 are copied to the first current logical page block 304 in the memory 30a, and the state of the block 304 is returned to that at the checkpoint. Thus, the first current logical page management block 302 and the first current logical page block 304 in the memory 30a are restored to the state at the checkpoint, and these blocks are correctly linked. Then, it is checked whether or not the new and old pointers point to the same physical page in all page mapping tables 3041 in the first current logical page block 304. If no, the data in the new pointer should point to what is pointed to by the old pointers (step S 52).

Thus, the transactions being processed at the checkpoint 5001 such as transactions $TR_1$, $TR_2$, $TR_3$, $TR_4$, etc. are determined to be unprocessed. Therefore, in FIG. 14, the data base stores the data as being processed up to the transaction which is completed before the solid line 5003. Since the checkpoint process requires no logs of the transactions which are completed before the solid line 5003 shown in FIG. 14, the logs in the system log file 412 can be nullified at the checkpoint.

In the transactions processed before the solid line 5003 shown in FIG. 14, all transactions which are completed before a system failure are redone according to the information in the transaction logs stored in the system log file 412 in the secondary storage unit 40, and the data base processed by these transactions are effectuated (step S53).

Figure 16:
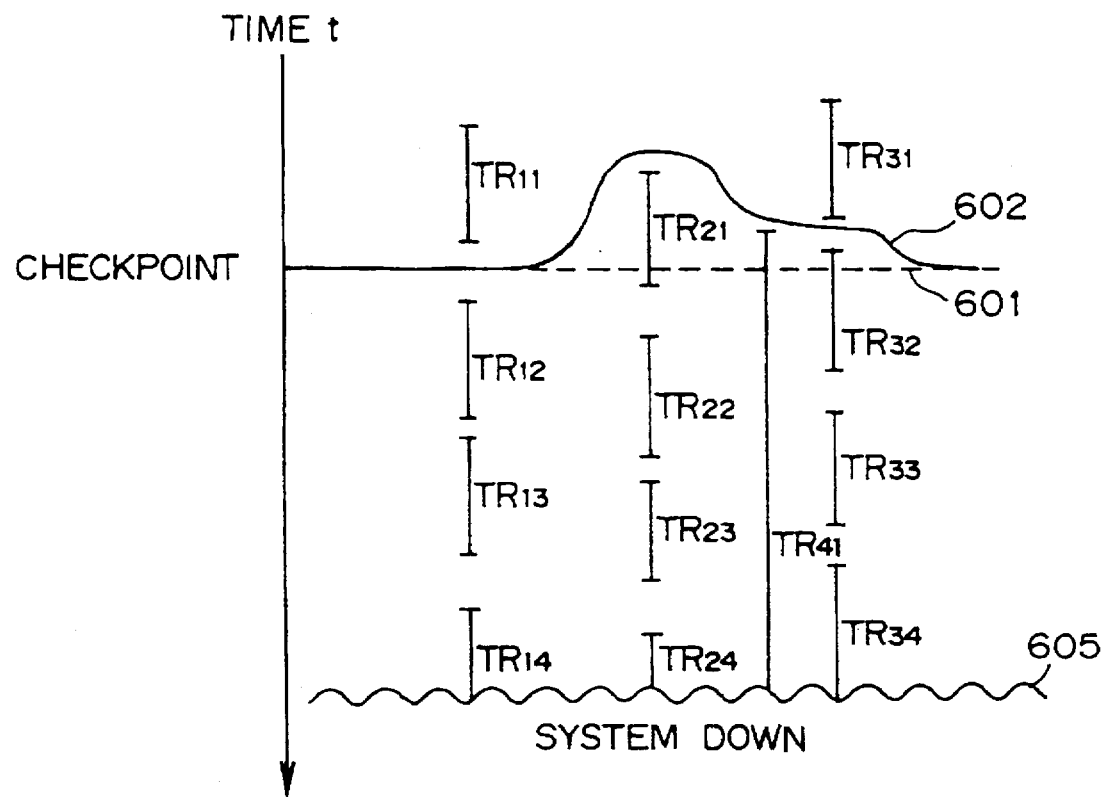
FIG. 16 shows in detail the recovery process.

The data base recovery operation in the recovery process is explained in detail by referring to FIG. 16.

In FIG. 16, a broken line 601 indicates a checkpoint, and a wave line 605 indicates an occurrence point of a system failure. $TR_{11}$ through $TR_{14}$, $TR_{21}$ through $TR_{24}$, $TR_{31}$ through $TR_{34}$, and $TR_{41}$ are transactions. The transactions shown in FIG. 16 are classified into five types I through V depending on the type of a recovery operation.

1) Transaction Type I

Transactions, for example, $TR_{11}$ and $TR_{31}$, which are completed before the checkpoint 601. The completion of a transaction is determined depending on whether or not a transaction log end flag is recorded in the system log file 412.

2) Transaction Type II

Transactions, for example, $TR_{21}$ and $TR_{32}$, which are being processed at the checkpoint 601 and are completed before the system failure occurrence point 605.

3) Transaction Type III

Transactions, for example, $TR_{12}$, $TR_{13}$, $TR_{22}$, $TR_{23}$, and $TR_{33}$, which are processed after the checkpoint 601, and completed before the system failure occurrence point 605.

4) Transaction Type IV

Transactions, for example, $TR_{14}$, $TR_{24}$, and $TR_{34}$, which are processed after the checkpoint 601 and are being processed at the system failure occurrence point 605.

5) Transaction Type V

Transactions, for example, $TR_{41}$, which are being executed at the checkpoint 601 and at the system failure occurrence point 605.

Described below is a failure recovery process for each of the transaction types I through V.

1. The processes performed by the Type-I transactions ($TR_{11}$ and $TR_{31}$) are effectuated, and the process results are copied to the data base in the secondary storage unit 40 at the checkpoint 601. Therefore, no process is required.
2. Type-II transaction ($TR_{21}$) is returned to an undone state (at the point indicated by the solid line 602 in FIG. 16) by the processes in steps S51 and S52 in the flowchart shown in FIG. 15. Then, the transaction log information 4124 about the transaction is read from the system log file 412 and redoes the transaction according to the information. Thus, the processes by the type-II transaction is effectuated and the result is copied to the data base.

The transaction information 4124 can be retrieved by searching the system log file 412 for the transaction log start flag and the transaction identifier 4122.
3. The type-III transactions ($TR_{12}$, $TR_{13}$, $TR_{22}$, $TR_{23}$, and $TR_{33}$) are returned to an undone state (that is, the data base is returned to the state at the point indicated by the solid line 602 shown in FIG. 16 by the processes in step S51 and S52). Then, the transaction log information is read from the system log file 412, and the transactions are redone according to the information. Thus, the processes of these transactions are effectuated.
4. The type-IV transactions ($TR_{14}$, $TR_{23}$, and $TR_{34}$) and the type-V transactions ($TR_{41}$) are not committed because a system failure has arisen during the process of the transactions. The process result is not copied to the data base in the secondary storage unit 40. Therefore, no process is performed. Since the transaction log end flag 4126 is not recorded in the system log file 412 for these transactions, it is determined whether or not a system failure has arisen in a transaction according to the presence/absence of the flag 4126.

According to the present embodiment, a checkpoint can be recorded even when a plurality of transactions are being processed because the first current logical page block 304, which is a page table for converting a logical page into a physical page, is managed by the shadow page system using the first current logical page management block 302. In this case, the operation of processing an old pointer to make it point to what is pointed to by a new pointer has to be performed only on the first current logical page management block 302 whose number of pointers is much smaller than that of the first current logical page block 304 (corresponding to the conventional page table). Thus, the checkpoint process can be performed at high speed.

At an occurrence of a system failure, the new and old pointers in the logical page block 404 stored as backup in the secondary storage unit 40 are processed to nullify the physical page whose data are updated by the transaction being processed at the checkpoint, and to define the physical page (shadow page) pointed to by the old pointer in the block 404 as a temporary latest physical page. Then, the data base is processed in the transaction on the temporary latest physical page according to the transaction log information 4124 about the transaction stored in the system log file 412 to complete the transaction. Thus, according to the checkpoint processing system of the present embodiment, a checkpoint can be recorded when a plurality of transactions are being executed. Even if a system failure arises, the transactions can be effectuated as long as the transactions have been completed at the occurrence of the system failure. Accordingly, the amount of the log from a checkpoint at the occurrence of a system failure can be reduced, thereby greatly shortening the time taken for a data base recovery process.

Figure 17:
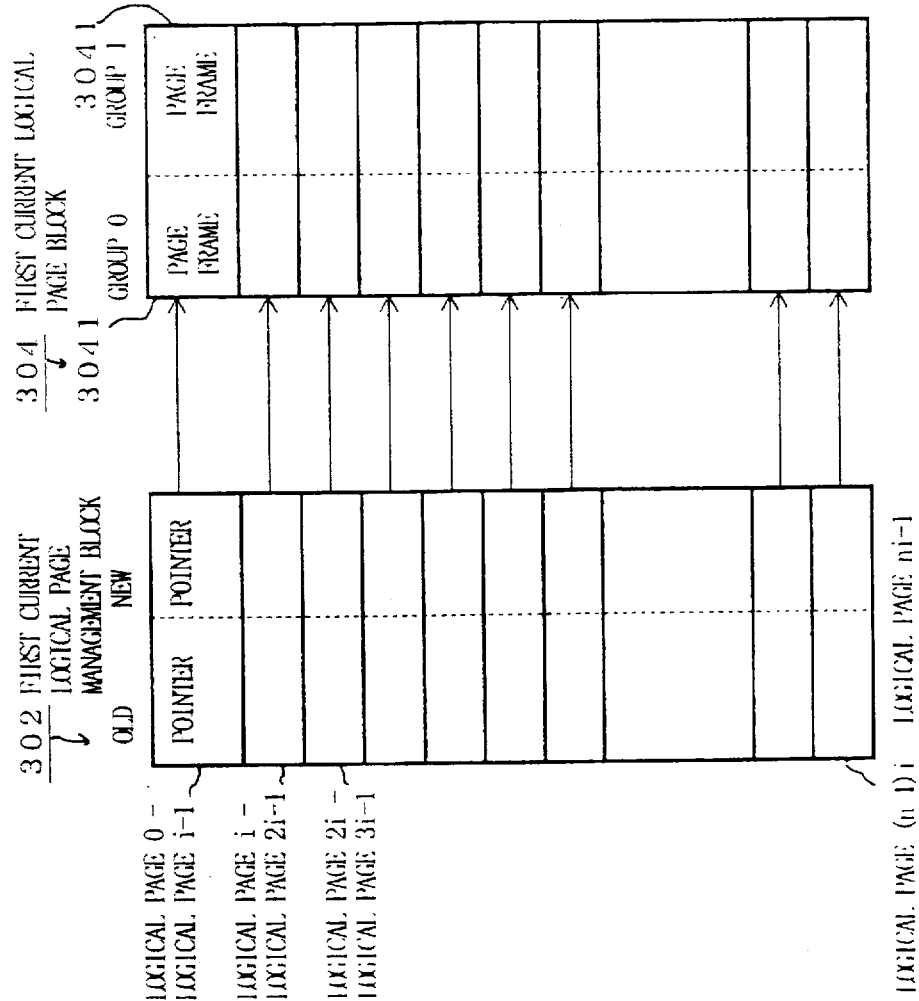
FIG. 17 shows other configurational examples of a logical page management block and a logical page block.

FIG. 17 shows another configuration example of the logical page management blocks (302 and 402) and the logical page blocks (304 and 404).

In the example, two physical pages (page frames 3041) are preliminarily allotted fixedly to each of the logical pages in the logical page blocks (304 and 404). These physical pages 3041 are divided into two groups 0 and 1 for each entry. That is, the first current logical page block 304 is positioned in the physical page area. At this time, the new and old pointers of the first current logical page management block 302 are set to point to a physical page of either group 0 or 1 of a corresponding entry. Therefore, the new and old pointers can be realized with a single bit. In this case, the new and old pointers function as flags.

With the configuration, a shadow page can be recorded and released in a bit unit, and the shadow page can be recorded and released in the page frame 3041 at and after a checkpoint, thereby greatly shortening the time taken for a checkpoint process.

The configurations of the first current logical page management block 302 and the first current logical page block 304 can be in the format of a directory which stores the correspondence between a logical page and a physical page. New pointers and old pointers can be managed in different page tables.

In the above described embodiment, the logical page management block 402 and the logical page block 404 form a duplex system. However, they don't have to necessarily form a duplex system. Both two blocks are not shared for backup. They can be alternately used as a block for backup. A non-volatile semiconductor memory such as a flash memory, a RAM disk, etc. can be used as the secondary storage unit 40. In this case, since the access speed is higher than with the magnetic disk and the optical magnetic disk, it is applicable to a data base with which a large number of online transaction processes are performed to support a plurality of clients in, for example, a client/server system.

As described above, a checkpoint can be recorded while a transaction is being processed, and the process can be performed at a high speed according to the present invention.

Furthermore, the log information required to redo a transaction which is being processed at the checkpoint and has been completed before the occurrence of a system failure, and a transaction which is processed after the checkpoint and has been completed before the occurrence of the system failure after the occurrence of the system failure.

Additionally, if a system failure has arisen, a data base can be restored to its state before the occurrence of the system failure at a high speed.

What is claimed is:

1. A data base management system comprising:

a secondary storage unit having data base storing means for storing data divided into physical pages, each physical page corresponding one-to-one to a logical page;

a current page table for managing position information about a latest physical page storing latest updated data and a shadow physical page storing the data before a latest update in each of the logical pages;

a current page table management table for pointing to a shadow page table which is a copy of the current page table at a checkpoint, and a latest page table which is the current page table as updated after the checkpoint;

blank physical page management means for managing unused physical pages in the secondary storage unit;

first updating means which accesses said current page table management table when data in a logical page is updated by a transaction, said first updating means referring to management information about said blank physical page management means when a shadow page table does not exist corresponding to the page table containing the position information about the physical page corresponding to the logical page and obtaining an unused physical page, thereafter said first updating means copying the data in the latest updated page table to the physical page and enters the copied data in said current page table management table as the latest page table for the logical page and a page table before the latest update as the shadow page table, said first updating means updating said blank physical page management means to indicate the obtained physical page as being used, and checks the position information about the physical page corresponding to the logical page in said current page table according to the management information in said current page table management table, and refers to the management information in said blank physical page management means if the shadow physical page corresponding to the logical page does not exist according to the position information thereafter obtaining a presently unused physical page from said data base storing means and entering the unused physical page in said current page table as the latest physical page of the logical page;

second updating means for writing the updated data of the logical page to the latest physical page corresponding to the logical page to be updated which is entered in said current page table by referring to said current page table updated by said first updating means, and changing the position information pointing to the shadow page corresponding to the logical page in said current page table such that the information points to the updated physical page; and third updating means for updating said blank physical page management means to indicate that the shadow physical page is unused.

2. The data base management system according to claim 1, wherein said current page table management table comprises:
a first pointer pointing to the shadow page table; and
a second pointer pointing to the latest page table.

3. The data base management system according to claim 2, wherein said shadow page table and said latest page table comprise a plurality of physical pages; and
said first pointer and said second pointer point to corresponding physical pages.

4. The data base management system according to claim 3, wherein said current page table manages said first pointer and said second pointer according to individual tables.

5. The data base management system according to claim 1, wherein said current page table comprises a first pointer pointing to the shadow physical page and a second pointer pointing to a latest physical page corresponding to each logical page.

6. The data base management system according to claim 5, wherein said current page table manages said first pointer and said second pointer according to individual tables.

7. The data base management system according to claim 1, wherein two physical pages are preliminarily assigned to each logical page in said current page table in the secondary storage unit, and the two physical pages are divided into two groups;

said current page table management table has two flags fixedly assigned to each of the two physical pages corresponding to respective logical pages in said current page table, and the two flags are set to values indicating to which of the shadow page table or the latest page table each physical page belongs.

8. The data base management table according to claim 1, further comprising:

a backup page table, provided in the secondary storage unit, for storing the data in said current page table at the checkpoint;

a backup page table management table, used for recovery of data base and provided in the secondary storage unit, for storing the data in a page table in which the position information about the physical page in the secondary storage unit for storing the data, which are to recover from a failure, in the corresponding logical page; and checkpoint processing means for changing the data in said current page table management table in the main storage unit such that only a present latest page table can be effectuated, copying the updated data to said backup page table management table in the secondary storage unit, and copying the data in said current page table in the main storage unit to said backup page table in the secondary storage unit.

9. The data base management system according to claim 8, wherein two said backup page table management tables are provided in the secondary storage unit; and said checkpoint processing means copies the data in the said current page table management table to the two page table management tables.

10. The data base management system according to claim 9, wherein an update flag is set in the secondary storage unit;

said checkpoint processing means sets the update flag while the data are copied to the page table management table to which data are to be written later, and the update flag is reset after the data have been copied.

11. The data base management table according to claim 9, wherein two said backup page table management tables are provided in the secondary storage unit; and said checkpoint processing means alternately uses the two page table management tables as the backup page table management tables to which the data of said current page table management table are copied.

12. The data base management table according to claim 9, wherein two said backup page tables are provided in the secondary storage unit 40;

said checkpoint processing means copies the data in said current page table to the two page tables.

13. The data base management system according to claim 12, wherein said checkpoint processing means sets the update flag while the data are copied to the page table to which data are to be written later, and the update flag is reset after the data have been copied.

14. The data base management table according to claim 8, wherein two said backup page table management tables are provided in the secondary storage unit; and said checkpoint processing means alternately uses the two page table management tables as the backup page table management tables to which the data of said current page table are copied.

15. The data base management table according to claim 8, wherein said checkpoint processing means changes the management information such that all physical pages forming the shadow page table deleted in said current page table management table are managed as being unused in said blank physical page management means.

16. The data base management system according to claim 8, further comprising:

a log file for recording log information of each transaction in the secondary storage unit; and log recording means for writing the log information of the transaction in the log file.

17. The data base management system according to claim 16, wherein the log information of each transaction stored in said log file comprises flags indicating at least a start of a transaction, an identifier uniquely assigned to the transaction, history information about operations of the data base of the transaction, and an end of the transaction.

18. The data base management system according to claim 17, wherein said history information about the operations of the data base of the transaction is time-series records about the operations relating to all updates of the data base performed in the transaction, said records being a set of information comprising at least a type of operation of the data base, a logical page on which the operation of the data base is performed, a physical page storing the data before the latest update of the logical page, and the physical page storing the data after the update of the logical page.

19. The data base management system according to claim 16, further comprising:

first control means for reading said backup page table management table from the secondary storage unit when a system failure has arisen, and copying the data in said backup page table management table to said current page table management table;

a second control means for reading said backup page table from the secondary storage unit when a system failure has arisen, changing the data in aid backup page table such that the position information about the logical page pointing to both the shadow physical page and the latest physical page as a corresponding physical page can refer only to the shadow physical page, and copying obtained data in the page table to said current page table; and third control means for restoring the data base in said data base storage means to a state in which transactions being processed at a checkpoint and having been completed before an occurrence of the system failure, and transactions processed after the checkpoint and having been completed before the occurrence of the system failure are completed after redoing the transaction according to said current page table management table generated by said first control means, said current page table generated by said second control means, and the log information stored in said log file.

20. A database management system comprising:

a current page table which shadow pages a physical page corresponding to a logical page with a first shadow physical page, said current page table having a page frame storing positional information identifying a physical page and a first shadow physical page in a page frame; and a current page table management table which shadow pages said current page table with a second shadow physical page containing shadow positional information identifying the physical page and the first shadow physical page.

21. A method for managing a database having a logical page with a corresponding physical page, the method comprising:

shadow paging the physical page with a first shadow physical page;

storing positional information in a page frame identifying the physical page and the first shadow physical page; and shadow paging the page frame with a second shadow physical page containing shadow positional information identifying the physical page and the first shadow physical page.

* * * * *

UNITED STATES PATENT AND TRADEMARK OFFICE
CERTIFICATE OF CORRECTION

PATENT NO. : 5,724,581
DATED : March 3, 1998
INVENTOR(S) : Kozakura

It is certified that error appears in the above-identified patent and that said Letters Patent is hereby corrected as shown below:

Title Page, Col. 2, line 4, delete fourth reference (entire line).

Col. 10, line 36, after "memory" insert --30a.--.

Col. 18, line 3, change "Therefore" to --Therefore,--.

Signed and Sealed this

Sixteenth Day of June, 1998

Attest:

BRUCE LEHMAN

*Attesting Officer*          *Commissioner of Patents and Trademarks*